US012646297B2

(12) United States Patent
Joshi et al.

(10) Patent No.: US 12,646,297 B2
(45) Date of Patent: Jun. 2, 2026

(54) NEURAL NETWORK MULTI-ATTRIBUTE FACIAL ENCODER AND DECODER

(71) Applicant: Smart Eye International Inc., Boston, MA (US)

(72) Inventors: Ajjen Das Joshi, Arlington, MA (US); Sandipan Banerjee, Boston, MA (US); Panu James Turcot, Pacifica, CA (US)

(73) Assignee: Smart Eye International Inc., Boston, MA (US)

( * ) Notice: Subject to any disclaimer, the term of this patent is extended or adjusted under 35 U.S.C. 154(b) by 266 days.

(21) Appl. No.: 18/212,742

(22) Filed: Jun. 22, 2023

(65) Prior Publication Data

US 2023/0419642 A1 Dec. 28, 2023

Related U.S. Application Data

(60) Provisional application No. 63/521,364, filed on Jun. 16, 2023, provisional application No. 63/431,057, (Continued)

(51) Int. Cl.
*G06V 10/774* (2022.01)
*G06N 3/0455* (2023.01)
(Continued)

(52) U.S. Cl.
CPC ......... *G06V 10/774* (2022.01); *G06N 3/0455* (2023.01); *G06N 3/0895* (2023.01); (Continued)

(58) Field of Classification Search
CPC .. G06N 3/0455; G06N 3/0464; G06N 3/0475; G06N 3/048; G06N 3/084; (Continued)

(56) References Cited

U.S. PATENT DOCUMENTS 3,034,500 A 5/1962 Backster, Jr.
3,548,806 A 12/1970 Fisher
(Continued)

FOREIGN PATENT DOCUMENTS

CN 115018994 A * 9/2022 ............. G06T 17/00
CN 116233567 A * 6/2023 ......... H04N 21/8146
(Continued)

OTHER PUBLICATIONS

Zhanxiong Wang et al. , "Multi-task Deep Neural Network for Joint Face Recognitionand Facial Attribute Prediction," Jun. 6-9, 2017, ICMR'17, Jun. 6-9, 2017, Bucharest, Romania, pp. 365-372.*
(Continued)

*Primary Examiner* — Omar S Ismail
(74) *Attorney, Agent, or Firm* — Adams Intellex, PLC

(57) ABSTRACT

Machine learning is used for a neural network multi-attribute facial encoder and decoder. A facial image is obtained for processing on a neural network and is encoded into two or more orthogonal feature subspaces. The encoding is performed by a single, trained encoder. The encoder is a downsampling encoder, orthogonality of the feature subspaces is established using metrics, and orthogonality enables separability of the feature subspaces. Embeddings are generated for two or more attributes of the facial image, wherein the embeddings are generated using one or more copies of the single, trained encoder. The embeddings comprise a vector representation of the two or more attributes of the facial image. A neural network is trained for a multi-task objective, wherein the training is based on the embeddings. The embeddings replace and augment training images. The multi-task objective provides identification of the two or more attributes of the facial image.

26 Claims, 10 Drawing Sheets

Related U.S. Application Data filed on Dec. 8, 2022, provisional application No. 63/354,723, filed on Jun. 23, 2022.

(51) Int. Cl.

| | |
|---|---|
| *G06N 3/0895* | (2023.01) |
| *G06T 11/00* | (2026.01) |
| *G06V 10/77* | (2022.01) |
| *G06V 10/776* | (2022.01) |
| *G06V 10/82* | (2022.01) |
| *G06V 20/59* | (2022.01) |
| *G06V 40/16* | (2022.01) |

(52) U.S. Cl.

CPC .......... *G06T 11/00* (2013.01); *G06V 10/7715* (2022.01); *G06V 10/82* (2022.01); *G06V 40/171* (2022.01); *G06V 10/776* (2022.01); *G06V 20/597* (2022.01)

(58) Field of Classification Search

CPC ...... G06N 3/0895; G06N 3/094; G06N 3/096; G06T 11/00; G06V 10/764; G06V 10/7715; G06V 10/774; G06V 10/776; G06V 10/778; G06V 10/82; G06V 20/597; G06V 40/171; G06V 40/174

See application file for complete search history.

(56) References Cited

U.S. PATENT DOCUMENTS

| | | |
|---|---|---|
| 3,870,034 A | 3/1975 | James |
| 4,353,375 A | 10/1982 | Colburn et al. |
| 4,448,203 A | 5/1984 | Williamson et al. |
| 4,794,533 A | 12/1988 | Cohen |
| 4,807,642 A | 2/1989 | Brown |
| 4,817,628 A | 4/1989 | Zealear et al. |
| 4,950,069 A | 8/1990 | Hutchinson |
| 4,964,411 A | 10/1990 | Johnson et al. |
| 5,016,282 A | 5/1991 | Tomono et al. |
| 5,031,228 A | 7/1991 | Lu |
| 5,219,322 A | 6/1993 | Weathers |
| 5,247,938 A | 9/1993 | Silverstein et al. |
| 5,259,390 A | 11/1993 | Maclean |
| 5,507,291 A | 4/1996 | Stirbl et al. |
| 5,572,596 A | 11/1996 | Wildes et al. |
| 5,619,571 A | 4/1997 | Sandstorm et al. |
| 5,647,834 A | 7/1997 | Ron |
| 5,649,061 A | 7/1997 | Smyth |
| 5,663,900 A | 9/1997 | Bhandari et al. |
| 5,666,215 A | 9/1997 | Fredlund et al. |
| 5,725,472 A | 3/1998 | Weathers |
| 5,741,217 A | 4/1998 | Gero |
| 5,760,917 A | 6/1998 | Sheridan |
| 5,762,611 A | 6/1998 | Lewis et al. |
| 5,772,508 A | 6/1998 | Sugita et al. |
| 5,772,591 A | 6/1998 | Cram |
| 5,774,591 A | 6/1998 | Black et al. |
| 5,802,220 A | 9/1998 | Black et al. |
| 5,825,355 A | 10/1998 | Palmer et al. |
| 5,886,683 A | 3/1999 | Tognazzini et al. |
| 5,898,423 A | 4/1999 | Tognazzini et al. |
| 5,920,477 A | 7/1999 | Hoffberg et al. |
| 5,945,988 A | 8/1999 | Williams et al. |
| 5,959,621 A | 9/1999 | Nawaz et al. |
| 5,969,755 A | 10/1999 | Courtney |
| 5,983,129 A | 11/1999 | Cowan et al. |
| 5,987,415 A | 11/1999 | Breese et al. |
| 6,004,061 A | 12/1999 | Manico et al. |
| 6,004,312 A | 12/1999 | Finneran et al. |
| 6,008,817 A | 12/1999 | Gilmore, Jr. |
| 6,026,321 A | 2/2000 | Miyata et al. |
| 6,026,322 A | 2/2000 | Korenman et al. |
| 6,056,781 A | 5/2000 | Wassick et al. |
| 6,067,565 A | 5/2000 | Horvitz |
| 6,088,040 A | 7/2000 | Oda et al. |
| 6,091,334 A | 7/2000 | Galiana et al. |
| 6,099,319 A | 8/2000 | Zaltman et al. |
| 6,134,644 A | 10/2000 | Mayuzumi et al. |
| 6,182,098 B1 | 1/2001 | Selker |
| 6,185,534 B1 | 2/2001 | Breese et al. |
| 6,195,651 B1 | 2/2001 | Handel et al. |
| 6,212,502 B1 | 4/2001 | Ball et al. |
| 6,222,607 B1 | 4/2001 | Szajewski et al. |
| 6,309,342 B1 | 10/2001 | Blazey et al. |
| 6,327,580 B1 | 12/2001 | Pierce et al. |
| 6,349,290 B1 | 2/2002 | Horowitz et al. |
| 6,351,273 B1 | 2/2002 | Lemelson et al. |
| 6,437,758 B1 | 8/2002 | Nielsen et al. |
| 6,443,840 B2 | 9/2002 | Von Kohorn |
| 6,530,082 B1 | 3/2003 | Del Sesto et al. |
| 6,577,329 B1 | 6/2003 | Flickner et al. |
| 6,606,102 B1 | 8/2003 | Odom |
| 6,629,104 B1 | 9/2003 | Parulski et al. |
| 6,792,458 B1 | 9/2004 | Muret et al. |
| 6,847,376 B2 | 1/2005 | Engeldrum et al. |
| 7,003,135 B2 | 2/2006 | Hsieh et al. |
| 7,013,478 B1 | 3/2006 | Hendricks et al. |
| 7,113,916 B1 | 9/2006 | Hill |
| 7,120,880 B1 | 10/2006 | Dryer et al. |
| 7,197,459 B1 | 3/2007 | Harinarayan et al. |
| 7,233,684 B2 | 6/2007 | Fedorovskaya et al. |
| 7,246,081 B2 | 7/2007 | Hill |
| 7,263,474 B2 | 8/2007 | Fables et al. |
| 7,266,582 B2 | 9/2007 | Stelting |
| 7,307,636 B2 | 12/2007 | Matraszek et al. |
| 7,319,779 B1 | 1/2008 | Mummareddy et al. |
| 7,327,505 B2 | 2/2008 | Fedorovskaya et al. |
| 7,350,138 B1 | 3/2008 | Swaminathan et al. |
| 7,353,399 B2 | 4/2008 | Ooi et al. |
| 7,355,627 B2 | 4/2008 | Yamazaki et al. |
| 7,428,318 B1 | 9/2008 | Madsen et al. |
| 7,474,801 B2 | 1/2009 | Teo et al. |
| 7,496,622 B2 | 2/2009 | Brown et al. |
| 7,549,161 B2 | 6/2009 | Poo et al. |
| 7,551,755 B1 | 6/2009 | Steinberg et al. |
| 7,555,148 B1 | 6/2009 | Steinberg et al. |
| 7,558,408 B1 | 7/2009 | Steinberg et al. |
| 7,564,994 B1 | 7/2009 | Steinberg et al. |
| 7,573,439 B2 | 8/2009 | Lau et al. |
| 7,580,512 B2 | 8/2009 | Batni et al. |
| 7,584,435 B2 | 9/2009 | Bailey et al. |
| 7,587,068 B1 | 9/2009 | Steinberg et al. |
| 7,610,289 B2 | 10/2009 | Muret et al. |
| 7,620,934 B2 | 11/2009 | Falter et al. |
| 7,644,375 B1 | 1/2010 | Anderson et al. |
| 7,676,574 B2 | 3/2010 | Glommen et al. |
| 7,757,171 B1 | 7/2010 | Wong et al. |
| 7,826,657 B2 | 11/2010 | Zhang et al. |
| 7,830,570 B2 | 11/2010 | Morita et al. |
| 7,881,493 B1 | 2/2011 | Edwards et al. |
| 7,921,036 B1 | 4/2011 | Sharma |
| 8,010,458 B2 | 8/2011 | Galbreath et al. |
| 8,022,831 B1 | 9/2011 | Wood-Eyre |
| 8,219,438 B1 | 7/2012 | Moon et al. |
| 8,401,248 B1 | 3/2013 | Moon et al. |
| 8,442,638 B2 | 5/2013 | Libbus et al. |
| 8,522,779 B2 | 9/2013 | Lee et al. |
| 8,600,120 B2 | 12/2013 | Gonion et al. |
| 8,640,021 B2 | 1/2014 | Perez et al. |
| 2001/0033286 A1 | 10/2001 | Stokes et al. |
| 2001/0041021 A1 | 11/2001 | Boyle et al. |
| 2002/0007249 A1 | 1/2002 | Cranley |
| 2002/0030665 A1 | 3/2002 | Ano |
| 2002/0042557 A1 | 4/2002 | Bensen et al. |
| 2002/0054174 A1 | 5/2002 | Abbott et al. |
| 2002/0084902 A1 | 7/2002 | Zadrozny et al. |
| 2002/0171551 A1 | 11/2002 | Eshelman |
| 2002/0182574 A1 | 12/2002 | Freer |
| 2003/0035567 A1 | 2/2003 | Chang et al. |
| 2003/0037041 A1 | 2/2003 | Hertz |
| 2003/0060728 A1 | 3/2003 | Mandigo |
| 2003/0093784 A1 | 5/2003 | Dimitrova et al. |
| 2003/0182123 A1 | 9/2003 | Mitsuyoshi |

(56) References Cited

U.S. PATENT DOCUMENTS

| | | |
|---|---|---|
| 2003/0191682 A1 | 10/2003 | Shepard et al. |
| 2003/0191816 A1 | 10/2003 | Landress et al. |
| 2004/0181457 A1 | 9/2004 | Biebesheimer |
| 2005/0187437 A1 | 8/2005 | Matsugu |
| 2005/0283055 A1 | 12/2005 | Shirai et al. |
| 2005/0289582 A1 | 12/2005 | Tavares et al. |
| 2006/0019224 A1 | 1/2006 | Behar et al. |
| 2006/0143647 A1 | 6/2006 | Bill |
| 2006/0170945 A1 | 8/2006 | Bill |
| 2006/0235753 A1 | 10/2006 | Kameyama |
| 2007/0167689 A1 | 7/2007 | Ramadas et al. |
| 2007/0173733 A1 | 7/2007 | Le et al. |
| 2007/0239787 A1 | 10/2007 | Cunningham et al. |
| 2007/0255831 A1 | 11/2007 | Hayashi et al. |
| 2007/0265507 A1 | 11/2007 | de Lemos |
| 2007/0299964 A1 | 12/2007 | Wong et al. |
| 2008/0059570 A1 | 3/2008 | Bill |
| 2008/0091512 A1 | 4/2008 | Marci et al. |
| 2008/0091515 A1 | 4/2008 | Thieberger et al. |
| 2008/0101660 A1 | 5/2008 | Seo |
| 2008/0103784 A1 | 5/2008 | Wong et al. |
| 2008/0184170 A1 | 7/2008 | Periyalwar |
| 2008/0201144 A1 | 8/2008 | Song et al. |
| 2008/0208015 A1 | 8/2008 | Morris et al. |
| 2008/0221472 A1 | 9/2008 | Lee et al. |
| 2008/0287821 A1 | 11/2008 | Jung et al. |
| 2008/0292151 A1 | 11/2008 | Kurtz et al. |
| 2009/0002178 A1 | 1/2009 | Guday et al. |
| 2009/0006206 A1 | 1/2009 | Groe |
| 2009/0083421 A1 | 3/2009 | Glommen et al. |
| 2009/0094286 A1 | 4/2009 | Lee et al. |
| 2009/0112694 A1 | 4/2009 | Jung et al. |
| 2009/0112810 A1 | 4/2009 | Jung et al. |
| 2009/0133048 A1 | 5/2009 | Gibbs et al. |
| 2009/0150919 A1 | 6/2009 | Lee et al. |
| 2009/0156907 A1 | 6/2009 | Jung et al. |
| 2009/0164132 A1 | 6/2009 | Jung et al. |
| 2009/0193344 A1 | 7/2009 | Smyers |
| 2009/0210290 A1 | 8/2009 | Elliott et al. |
| 2009/0217315 A1 | 8/2009 | Malik et al. |
| 2009/0259518 A1 | 10/2009 | Harvey |
| 2009/0270170 A1 | 10/2009 | Patton |
| 2009/0271417 A1 | 10/2009 | Toebes et al. |
| 2009/0285456 A1 | 11/2009 | Moon et al. |
| 2009/0299840 A1 | 12/2009 | Smith |
| 2010/0070523 A1 | 3/2010 | Delgo et al. |
| 2010/0086215 A1 | 4/2010 | Bartlett et al. |
| 2010/0099955 A1 | 4/2010 | Thomas et al. |
| 2010/0266213 A1 | 10/2010 | Hill |
| 2010/0274847 A1 | 10/2010 | Anderson et al. |
| 2010/0324437 A1 | 12/2010 | Freeman |
| 2011/0007174 A1 | 1/2011 | Bacivarov et al. |
| 2011/0126226 A1 | 5/2011 | Makhlouf |
| 2011/0134026 A1 | 6/2011 | Kang et al. |
| 2011/0143728 A1 | 6/2011 | Holopainen et al. |
| 2011/0144971 A1 | 6/2011 | Danielson |
| 2011/0196855 A1 | 8/2011 | Wable et al. |
| 2011/0231240 A1 | 9/2011 | Schoen et al. |
| 2011/0251493 A1 | 10/2011 | Poh et al. |
| 2011/0263946 A1 | 10/2011 | el Kaliouby et al. |
| 2012/0324491 A1 | 12/2012 | Bathiche et al. |
| 2013/0023337 A1 | 1/2013 | Bowers et al. |
| 2013/0116587 A1 | 5/2013 | Sommo et al. |
| 2013/0197409 A1 | 8/2013 | Baxter et al. |
| 2014/0172910 A1 | 6/2014 | Jung et al. |
| 2016/0104486 A1 | 4/2016 | Penilla et al. |
| 2017/0003784 A1 | 1/2017 | Garg et al. |
| 2020/0210768 A1* | 7/2020 | Turkelson ............ G06T 7/0002 |
| 2020/0218940 A1* | 7/2020 | Anglin ................. H04L 9/0637 |
| 2021/0004589 A1* | 1/2021 | Turkelson ........... G06V 10/809 |
| 2021/0142164 A1* | 5/2021 | Liu .......................... G06F 40/40 |
| 2021/0232803 A1* | 7/2021 | Fu ......................... G06N 3/0455 |
| 2021/0406324 A1* | 12/2021 | Cuan ..................... G06F 16/954 |
| 2022/0300807 A1* | 9/2022 | Spagnoli ................. G06N 3/08 |
| 2022/0391590 A1* | 12/2022 | Shah ...................... G06N 3/045 |
| 2023/0419642 A1* | 12/2023 | Joshi ..................... G06V 10/82 |
| 2024/0153201 A1* | 5/2024 | Ranjan ................... G06T 15/08 |

FOREIGN PATENT DOCUMENTS

| | | | | |
|---|---|---|---|---|
| CN | 117115290 A | * | 11/2023 | ............ G06T 11/00 |
| CN | 118608636 A | * | 9/2024 | ............ G06N 3/048 |
| CN | 119254971 A | * | 1/2025 | ............ G06T 9/002 |
| JP | 08115367 | | 7/1996 | |
| KR | 10-2005-0021759 A | | 3/2005 | |
| KR | 10-2008-0016303 A | | 2/2008 | |
| KR | 10-2010-0048688 A | | 5/2010 | |
| WO | WO 2011/045422 A1 | | 4/2011 | |
| WO | WO-2024254289 A2 | * | 12/2024 | ............ G06V 10/82 |

OTHER PUBLICATIONS

Ira Cohen et al., "Learning Bayesian Network Classifiers for Facial Expression Recognition using both Labeled and Unlabeled Data," Jul. 15, 2003,2003 IEEE Computer Society Conference on Computer Vision and Pattern Recognition, 2003. Proceedings, pp. 1-7.*

Zhixin Shu et al., "Neural Face Editing with Intrinsic Image Disentangling," Jul. 2017, Proceedings of the IEEE Conference on Computer Vision and Pattern Recognition (CVPR), 2017, pp. 5541-5548.*

Beat Fasel , "Robust Face Analysis using Convolutional Neural Networks," Dec. 10, 2002, 2002 International Conference on Pattern Recognition, 2002, pp. 40-43.*

Khalil Khan et al., "A Multi-Task Framework for Facial Attributes Classification through End-to-End Face Parsing and Deep Convolutional Neural Networks," Jan. 7, 2020, Sensors 2020, 20, 328, pp. 1-11.*

Daniel S'aez Trigueros et al., "Face Recognition: From Traditional to Deep Learning Methods," Oct. 31, 2018, arXiv: 1811.00116v1, Computer Vision and Pattern Recognition, pp. 1-9.*

Alberto Albiol et al., "Face recognition using HOG-EBGM," Apr. 7, 2008, Pattern Recognition Letters 29 (2008), pp. 1538-1542.*

Sifei Liu et al., "Multi-Objective Convolutional Learning for Face Labeling," Jun. 2015, Proceedings of the IEEE Conference on Computer Vision and Pattern Recognition (CVPR), 2015, pp. 3451-3458.*

Masakazu Matsugu et al., "Subject independent facial expression recognition with robust face detection using a convolutional neural network," Jun. 14, 2003, Neural Networks 16 (2003), vol. 16, Issues 5-6, Jun.-Jul. 2003, pp. 555-558.*

Rana Ayman El Kaliouby, Mind-reading machines: automated inference of complex mental states, Jul. 2005, University of Cambridge, Cambridge, United Kingdom.

International Search Report dated Nov. 14, 2011 for PCT/US2011/39282.

International Search Report dated Apr. 16, 2012 for PCT/US2011/054125.

International Search Report dated May 24, 2012 for PCT/US2011/060900.

Xiaoyu Wang, An HOG-LBP human detector with partial occlusion handling, Sep. 29, 2009, IEEE 12th International Conference on Computer Vision, Kyoto, Japan.

Zhihong Zeng, A Survey of Affect Recognition Methods: Audio, Visual, and Spontaneous Expressions, Jan. 2009, IEEE Transactions on Pattern Analysis and Machine Intelligence, vol. 31, No. 1.

Nicholas R. Howe and Amanda Ricketson, Improving the Boosted Correlogram, 2004, Lecture Notes in Computer Science, ISSN 0302-9743, Springer-Verlag, Germany.

Xuming He, et al, Learning and Incorporating Top-Down Cues in Image Segmentation, 2006, Lecture Notes in Computer Science, ISBN 978-3-540-33832-1, Springer-Verlag, Germany.

Ross Eaton, et al, Rapid Training of Image Classifiers through Adaptive, Multi-frame Sampling Methods, Oct. 2008, IEEE 37th Applied Imagery Pattern Recognition Workshop, Washington DC.

Verkruysse, Wim, Lars O. Svaasand, and J. Stuart Nelson. "Remote plethysmographic imaging using ambient light." Optics express 16.26 (2008): 21434-21445.

(56) References Cited

OTHER PUBLICATIONS

Albiol, Alberto, et al. "Face recognition using HOG-EBGM."
Pattern Recognition Letters 29.10 (2008): 1537-1543.
Fasel, B. (Aug. 2002). Robust face analysis using convolutional
neural networks. In Object recognition supported by user interaction
for service robots (vol. 2, pp. 40-43). IEEE.
Matsugu, M., Mori, K., Mitari, Y., & Kaneda, Y. (2003). Subject
independent facial expression recognition with robust face detection
using a convolutional neural network. Neural Networks, 16(5-6),
555-559.

* cited by examiner

NEURAL NETWORK MULTI-ATTRIBUTE FACIAL ENCODER AND DECODER

RELATED APPLICATIONS

This application claims the benefit of U.S. provisional patent applications "Neural Network Multi-Attribute Facial Encoder" Ser. No. 63/354,723, filed Jun. 23, 2022, "Solar Load Usage In A Vehicular Environment" Ser. No. 63/431, 057, filed Dec. 8, 2022, and "Neural Network Multi-Attribute Facial Encoder And Decoder" Ser. No. 63/521,364, filed Jun. 16, 2023.

Each of the foregoing applications is hereby incorporated by reference in its entirety.

FIELD OF ART

This application relates generally to machine learning and more particularly to a neural network multi-attribute facial encoder and decoder.

BACKGROUND

Missed trains and buses, cancelled flights, and long delays for ride shares all challenge even the most patient and experienced travelers on many levels. Irrespective of whether the travelers are availing themselves of public transportation or using a personal vehicle, travelers may experience many complex and frustrating situations. The situations include being trapped in gridlocked traffic, waiting in seemingly endless security check lines as boarding times click closer, and traveling in packed vehicles, among many others. The motivations for people to travel are often personal and varied. Travel can include transferring from one geographic location to another for financial reasons such as commuting to and from work or school. Personal reasons for travel often include adventure, discovery, exercise, recovery, relaxation, and vacation, among many others. Some travel is forced by tragic circumstances. The individuals may be unwilling travelers who are forcibly displaced by fleeing war, famine, natural disasters, or economic hardship. The modes of transportation chosen for travel are numerous and varied. Transportation choices are premised on availability, convenience, and usually cost. Transportation choices further depend on the travel purposes including crossing town, hauling goods, or safety. The transportation modes from which a traveler chooses include air, ground, and water transportation.

Time is considered by many to be the scarcest commodity, yet substantial time is consumed getting to, waiting for, and traveling in vehicles. Many travelers use public transportation networks such as buses, trains, and airplanes; ride-hailing services such as Lyft™ and Uber™; personal vehicles; and car sharing services such as Zipcar™ to travel among their various destinations. Daily commutes to work or school constitute routine travel, as do extracurricular activities such as sports practices and music or language lessons, taking pets to the veterinary, shopping, running errands, business or vacation trips, and the many other purposes. The transportation needs are met more or less successfully by a range of vehicle types. Vehicle choices are often compelled by people's residential location and their travel destinations. Vehicles can range from cars and motorcycles; to buses, trains, and subways; to ride sharing services; and even to unmotorized vehicles such as bicycles, skateboards, or scooters. Travel is time consuming at its best, and horrible at its worst. Rush hour traffic or accidents;

inexperienced, incompetent, impaired, or dangerous vehicle operators; and poorly maintained roads all complicate travel. The difficulties of transportation are further compounded by operating an unfamiliar vehicle, driving in an unfamiliar city, navigating an unfamiliar public transportation network, and managing traffic travel lane challenges. These transportation challenges can have catastrophic consequences. Distracted, sleepy, or impaired vehicle operators can cause vehicular accidents and injury to themselves, pedestrians, bicyclists, animals, and property.

SUMMARY

Machine learning techniques for a neural network multi-attribute facial encoder and decoder are disclosed. An individual can experience one or more emotions, mental states, cognitive states, and so on while interacting with a device, consuming media, operating a vehicle, etc. Since operating a vehicle comprises a variety of complicated tasks that must each be successfully accomplished by the individual, facial encoding can be used to gauge a plurality of states for the individual. Perhaps among the most telling or indicative states are the emotions that the individual can experience. The emotional state of the individual, such as neutrality, anger, distrust, happiness, sadness, and/or surprise, can be used for a wide variety of purposes. One or more emotional states can be used to determine whether the individual is engaged with the tasks associated with driving or is distracted, inattentive, unwell, impaired, etc. Determination of states can be used to recommend an appropriate "soundtrack" that can soothe or motivate the individual. An alternative travel route can be suggested to avoid traffic, to provide a more interesting landscape, and the like. Additionally, a distracted driver can receive a suggestion to pull over, take a break, deal with the distraction, and then get back to driving. Further, identifying that an individual is impaired can be used to prevent the individual from operating the vehicle, can convert operation of the vehicle to semi-autonomous or autonomous mode, etc.

A computer-implemented method for machine learning is disclosed comprising: obtaining a facial image for processing on a neural network; encoding the facial image into two or more orthogonal feature subspaces, wherein the encoding is performed by a single, trained encoder, wherein the encoder is a downsampling encoder, wherein orthogonality of the feature subspaces is established using metrics, and wherein the orthogonality enables separability of the feature subspaces; and generating embeddings for two or more attributes of the facial image, wherein the embeddings are generated using one or more copies of the single, trained encoder. In embodiments, the embeddings comprise a vector representation of the two or more attributes of the facial image. Some embodiments further comprise training a neural network for a multi-task objective, wherein the training is based on the embeddings. In embodiments, the embeddings replace training images. And in embodiments, the embeddings augment training images.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
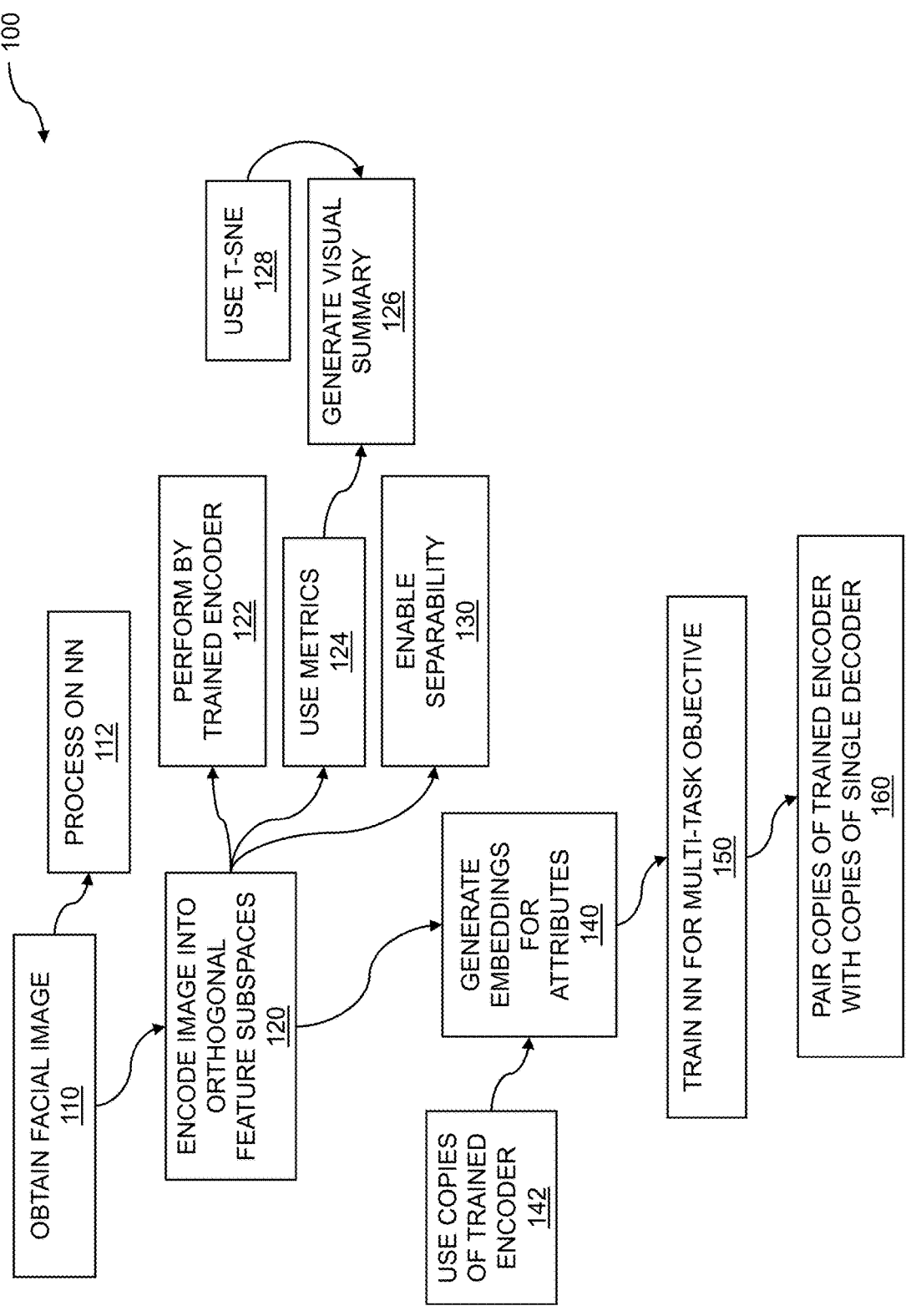
FIG. 1 is a flow diagram for a neural network multi-attribute facial encoder.

Machine learning techniques can be used to analyze images of individuals. The individuals can be interacting with personal electronic devices such as smartphones, tablets, or computers; consuming media such as news, movies, or e-sports; operating or traveling in vehicles; and so on. As the individual is interacting with devices, media, or vehicles, the individual can experience a variety of mood, emotional, and cognitive states. These states can manifest in an individual's face as facial expressions, head positions, and the like. Images such as facial images of individuals can be obtained, and the images can be encoded into orthogonal feature spaces. The encoding can be accomplished by a downsampling encoder, where the encoder comprises a trained neural network. The orthogonal feature spaces can include identities of one or more individuals, one or more moods or emotions associated with the individuals, and so on. The orthogonal feature spaces can further include other features such as image lighting, presence or lack of facial hair, presence or lack of facial coverings or objects such as sunglasses, etc. The encoded subspaces enable improved processing of the facial images by the neural network. The processing improvement is enabled by the smaller datasets that result from the encoding of the facial images. One or more copies of the trained encoder can be used to generate embeddings for the attributes of the facial image. Embeddings, which can include a low-dimensional vector representation of high-dimensional data such as facial images, can be used for training a copy of a single encoder to process facial images for features.

The neural network multi-attribute facial encoder can be applied to a variety of applications such as determining facial attributes associated with operators and passengers within vehicles. The encoder can be used to determine facial attributes such as identity, emotion, lighting, pose, or age of one or more individuals within a vehicle. By determining facial attributes associated with vehicle operators, recommendations can be made, actions can be taken, and so on. A vehicle operator who is presenting facial attributes associated with anger, boredom, or inattention can be presented with alternative travel route recommendations, media recommendations to provide a calming or motivating soundtrack or to engage the vehicle operator, vehicle environment controls for temperature and lighting, etc. A vehicle operator who is presenting facial attributes associated with sleepiness can be presented with a recommendation to pull over to take a break. An operator who is presenting attributes associated with sleep or impairment can be prevented from entering or operating a vehicle, or the operation of the vehicle can be switched from manual control to semi-autonomous or autonomous operation, thereby reducing risk or preventing a dangerous driving situation.

Machine learning techniques for a neural network multi-attribute encoder are disclosed. Facial features, attributes, and so on that are associated with facial images of an individual can be encoded using a neural network that has been trained as an encoder. The encoder can encode a facial image into orthogonal feature subspaces. The encoded feature subspaces can be represented by vectors. The feature subspaces can be based on facial attributes such as identity, emotions, pose, or age of an individual. The emotions can include neutrality, anger, distrust, happiness, sadness, and/or surprise, among other emotions, cognitive states, etc. The feature subspaces can further be based on image lighting. In embodiments, the facial attributes can include facial coverings, facial hair, gaze direction, etc. The encoder can include a downsampling encoder that can reduce the sizes of datasets processed by the neural network. The datasets that are processed can include training datasets used to train the neural network to act as a multi-attribute facial encoder. The datasets can further include facial image datasets that can be processed by the trained encoder. Embeddings can be generated for attributes of the facial image by using one or more copies of the trained encoder. The embeddings can be represented by vectors and can be used to train a neural network for a multi-task objective.

FIG. 1 is a flow diagram for a neural network multi-attribute facial encoder. A neural network encoder can be used to encode a facial image into two or more orthogonal feature subspaces. The encoding of the orthogonal feature subspaces is performed by a single trained encoder rather than a plurality of encoders. The encoder accomplishes downsampling, thereby converting large, unstructured datasets such as facial image datasets into a structured set of samples in lower dimensionalities. The orthogonality of the feature subspaces is established using metrics which can include weak classification and/or silhouette scores, a loss function, and t-distributed Stochastic Neighbor Encoding (t-SNE). The feature subspaces can be separated, analyzed, and processed separately based on the orthogonality. Embeddings or encodings are generated for attributes of the facial image. The embeddings are generated using copies of the single, trained encoder.

The flow 100 includes obtaining 110 a facial image. The facial image can be obtained using an image capture device such as a webcam, a video camera, a still camera, and so on. The facial image can be obtained using an in-vehicle video capture device such as a camera positioned on, in, or behind a rear-view mirror, a camera mounted on or in a vehicle center console, a camera mounted on a steering wheel, and so on. The facial image that is captured can be based on various wavelengths of light such as visible light, infrared light, near-infrared light, etc. In embodiments, the image data can include red/blue/green-formatted (RGB) image data. The image data can further include infrared (IR) image data, near-infrared (NIR) image data, etc. In the flow 100, the facial image is obtained for processing 112 on a neural network. The neural network can include a feed-forward neural network, a recurrent neural network, a convolutional neural network, and so on. The neural network can be trained for machine learning, deep learning, encoding, decoding, etc. The neural network can comprise layers, where the layers can include one or more of input layers, hidden layers, and output layers. The hidden layers can include fully connected layers, bottleneck layers, activation layers, etc. An activation layer can include a binary step function, a linear activation function, a hyperbolic tangent (Tanh) function, a rectifier linear unit (ReLU), a sigmoid function, and so on.

The flow 100 includes encoding 120 the facial image into two or more orthogonal feature subspaces. Encoding can include a technique for efficiently handling large datasets of unlabeled data, such as datasets comprising facial image data. The encoding enables the unlabeled facial image data, which comprises high-dimensionality data, to be converted to "encoded" low-dimensionality data. Unlabeled image data can include data that has not been tagged with labels that can be used to designate or identify characteristics, properties, or classifications associated with the data. The unlabeled data can be used to train a neural network based on an unsupervised learning technique (discussed below). In embodiments, the feature subspaces can include facial attributes. The facial attributes can include facial features, facial expressions, and so on. The facial attributes can include objects obscuring the face such as glasses, sunglasses, face coverings, eye patches, etc. The facial attributes can include facial hair. In embodiments, the encoder can normalize features using sigmoid activation. Other activation functions, including linear activation, rectified linear unit (ReLU), hyperbolic tangent (Tanh), Heaviside, and other functions, can be used. In embodiments, the facial attributes can include identity, emotion, lighting, pose, or age. Discussed throughout, identity can be based on facial recognition. Lighting can include bright light, partial or shaded light, low light, flat light, etc. Pose can include a facial or head angle based on roll, pitch, and yaw. In embodiments, an emotion feature subspace can include neutrality, anger, distrust, happiness, sadness, and/or surprise. Other feature subspaces can be based on further emotions, on moods, on cognitive states, and the like.

In the flow 100, the encoding is performed 122 by a single, trained encoder. The single, trained encoder can include a neural network that has been trained to perform an encoding task. The neural network can be trained by providing a training dataset for processing by the neural network. The training can be based on supervised training in which a labeled dataset and expected processing results are provided. The training can be based on semi-supervised training which can use semi-labeled facial image training data. Semi-supervised training can use both labeled data and unlabeled data for encoder training. Different from supervised training where a machine learning neural network processes labeled data to determine patterns and relationships between a target variable and a dataset, semi-supervised training can be based on "learning" by processing the labeled and unlabeled data. In embodiments, the encoder is a downsampling encoder. The downsampling by the encoder can accomplish reduction of the sizes of feature maps such as feature maps associated with facial images.

In the flow 100, orthogonality of the feature subspaces is established using metrics 124. Discussed below, one or more copies of the trained encoder can be used for encoding a facial image into two or more orthogonal feature subspaces. The same, single encoder can be used to extract encoded features in different subspaces. Hence, there's only one single encoder, but the same encoder produces multiple features in different subspaces from a single input image. A variety of metrics can be used to estimate the orthogonality of the subspaces. In embodiments, the metrics can include weak classification and/or silhouette scores. Silhouette analysis can be based on studying separation distance between clusters. In embodiments, the clusters can include feature subspace clusters. In other embodiments, the metrics can include a loss function. A loss function can be used to gauge the effectiveness of an encoding. If the encoding is effective, then an output of the loss function can be small. If the encoding is ineffective, then the output of the loss function can be large or above an acceptable value or threshold. In embodiments, the loss function can include a disentanglement loss. A disentanglement loss can be based on decomposing or "disentangling" a feature such as a facial feature into narrowly defined variables. The variables can be encoded as separate dimensions. In embodiments, disentanglement can prevent subspace interference. In further embodiments, the metrics include t-distributed Stochastic Neighbor Encoding (t-SNE). The t-SNE for metrics can be based on applying a non-linear dimensionality reduction technique. The technique seeks to group together similar data points such as data points associated with the same feature space, while spreading away from data points from other orthogonal feature subspaces. The technique can reduce high-dimensionality data such unstructured data to low-dimensionality data, where the low-dimensionality data can include two or three dimensions.

The metrics can include a variety of loss functions used to train the neural network and avoid entangled attribute subspaces. The loss functions can include a classification loss ($L_{cls}$), to enable learning class association of the image within each of the different attribute spaces; a contrastive loss ($L_{con}$), to enable learning relationships without requiring additional input image labels; a reconstruction loss ($L_{rec}$), to enable learning representations at a spatial level; an "other unlabeled" loss ($L_{oth}$), to enable learning (and avoiding) feature space muddying; and a disentanglement loss ($L_{dis}$), to enable learning from additional feature combinations. One or more of the loss functions can be weighted and added together to provide a final loss function. In embodiments, the metrics include a full loss function, $L_{full}$, which equals the sum of $\lambda_{cls} \cdot L_{cls} + \lambda_{con} \cdot L_{con} + \lambda_{rec} \cdot L_{rec} + \lambda_{oth} \cdot L_{oth} + \lambda_{dis} \cdot L_{dis}$, where $\lambda$ is a learned, balancing coefficient, and $L_{cls}$ is classification loss, $L_{con}$ is a contrastive loss, $L_{rec}$ is a reconstruction loss, $L_{oth}$ is an "other unlabeled" loss, and $L_{dis}$ is a disentanglement loss. In embodiments, a balancing coefficient vector $[\lambda_{cls}, \lambda_{con}, \lambda_{rec}, \lambda_{oth}, \lambda_{dis}]$ is initialized to [1, 1, 100, 1, 0.1], respectively.

The flow 100 further includes generating a visual summary 126 of encoder performance. The visual summary can include a two-dimensional rendering of orthogonal feature subspace data. The two-dimensional rendering can include a scatter plot. The visual summary can include clusters or groups of points. The clusters of groupings can result from the encoding and can be associated with two or more orthogonal feature subspaces. In the flow 100, the generating the visual summary is accomplished using the t-SNE 128. Discussed previously, the t-SNE can convert high-dimensionality data such as unlabeled facial image data to low-dimensionality representations of the data. The low-dimensionality data, which can include two or three dimensions, can be rendered on a display. The display can include a smartphone display, a tablet display, a display associated with a laptop or desktop computer, and so on. In the flow 100, the orthogonality enables separability 130 of the feature subspaces. Recall that encoding of facial images includes encoding into two or more orthogonal feature subspaces. Based on the metrics, encoding groups' similar features is accomplished. The encoding can generate two or more groups, where each group represents an individual feature subspace. Effective encoding can generate small groupings for each feature subspace while separating the feature subspace grouping from each other. Examples of groupings are presented and discussed below.

The flow 100 includes generating embeddings 140 for two or more attributes of the facial image. Recall that the facial images with which the two or more attributes can be associated can comprise large, unstructured datasets. The images can be difficult to process because of the large sizes. Further, because of the large number of dimensions, identifying feature attributes within the image can also be processing intensive. Embeddings can include a structured representation of unstructured data such as unstructured facial image data. The embeddings can be generated based on an attribute associated with data. In embodiments, the embeddings can include a vector representation of the two or more attributes of the facial image. The vector representation of the two or more facial attributes can include a low-dimensional vector representation of higher-dimensional data such as unstructured data. The low-dimensional vector can include relationships within higher-dimensional image data. Similarities between data points in the higher-dimensional data can be included as distances between embedding vectors. Discussed previously, the lighting can include light or shadow, bright light, flat light, and so on. The insensitive image analysis can proceed based on locations of facial regions or landmarks, presence or absence of facial occlusions such as facial hair or sunglasses, and the like, described further below. In the flow 100, the embeddings are generated using one or more copies 142 of the single, trained encoder. The single, trained encoder can be applied to separate facial attributes. The trained encoder can use weights and measures tuned to a facial attribute.

The flow 100 further includes training 150 a neural network for a multi-task objective, wherein the training is based on the embeddings. In embodiments, the multi-task objective can provide identification of the two or more attributes of the facial image. A neural network can be trained using one or more techniques. The techniques can include supervised training, semi-supervised training, unsupervised training, and so on. Supervised training can be accomplished by providing a labeled dataset to a neural network. The training data can be labeled, where the labeling can tag the data. The tagging the data can identify one or more properties associated with the data. The training can be accomplished by processing the labeled data with the neural network to be trained. The training comprises adjusting weights, biases, etc., associated with nodes within the neural network. The adjusting continues until the neural network correctly deduces or identifies the properties associated with the data. The training can be based on semi-supervised training. In embodiments, the encoding can enable semi-labeled facial image training. The semi-supervised training can be based on processing semi-labeled facial image data. The semi-labeled facial image training can be used to accomplish the semi-supervised training of the encoder neural network. Semi-supervised training can be based on the use of labeled data and unlabeled data. Different from supervised training in which a machine learning neural network processes labeled data to determine patterns and to uncover relationships between a target variable and a dataset, semi-supervised training can be based on "learning" by processing labeled and unlabeled data. Since the amount of labeled data is relatively small due to the amount of effort required to label the data, the use of both labeled and unlabeled data enables a much larger dataset to be applied to the neural network learning/training process. The neural network training can further include unsupervised or "self-supervised" training. For unsupervised training, an unlabeled dataset is provided to the neural network. In embodiments, the encoding enables unlabeled facial image training. The neural network processes the data and tries to identify patterns within the data. In embodiments, disentanglement loss can enable self-supervised training.

In embodiments, the embeddings can replace training images. Since the embeddings are smaller in size than the facial images, the processing of the embeddings can require less time and can enable faster convergence on the weights and biases associated with the nodes of the neural network. In other embodiments, the embeddings can augment training samples. Generally, providing more training data to the neural network enables improved training results. Augmenting with the embeddings can substantially expand the size of the training dataset, thereby improving training results. The trained neural network for a multi-task objective can be promoted to a production neural network. The production neural network can process image data, embeddings, and so on. In embodiments, the embeddings can enable image analysis that is insensitive to facial attributes, such as lighting, pose, or gender. The embeddings can enable image analysis that is further insensitive to facial attributes, such as mood, emotion, cognitive state, and the like.

The flow 100 further includes pairing 160 the one or more copies of the single, trained encoder with one or more single decoders. The single decoder can include a plurality of the single decoders to provide greater throughput and performance. Each of the decoders can be "tuned" or trained to decode embeddings associated with a specific facial attribute subspace. In embodiments, the one or more single decoders can be upsampling decoders. The upsampling decoders can "re-expand" embeddings to generate facial images. In embodiments, the one or more single decoders can enable synthetic image generation. The synthetic images can include composite images, where the composite images result from an unlabeled sample image that is fed into the single decoder along with one or more embeddings. The composite images can anonymize the facial images that were encoded. In embodiments, the one or more single decoders can be based on a generative adversarial network (GAN) architecture. A GAN comprises two neural networks, a generator which generates synthetic data such as image data, and a discriminator which tries to differentiate real data such as image data from synthetic data. The generator "learns" to generate data that fools the discriminator, while the discriminator learns to discriminate synthetic data from real data, thereby thwarting the generator. The result is a set of highly realistic synthetic images. The synthetic images can include composite images. The single decoder can comprise a style-based GAN decoder, or simply a style-based decoder. A style-based decoder is a type of GAN architecture that gives control over disentangled style properties of generated images.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. Various embodiments of the flow 100, or portions thereof, can be included on a semiconductor chip and implemented in special purpose logic, programmable logic, and so on.

Figure 2:
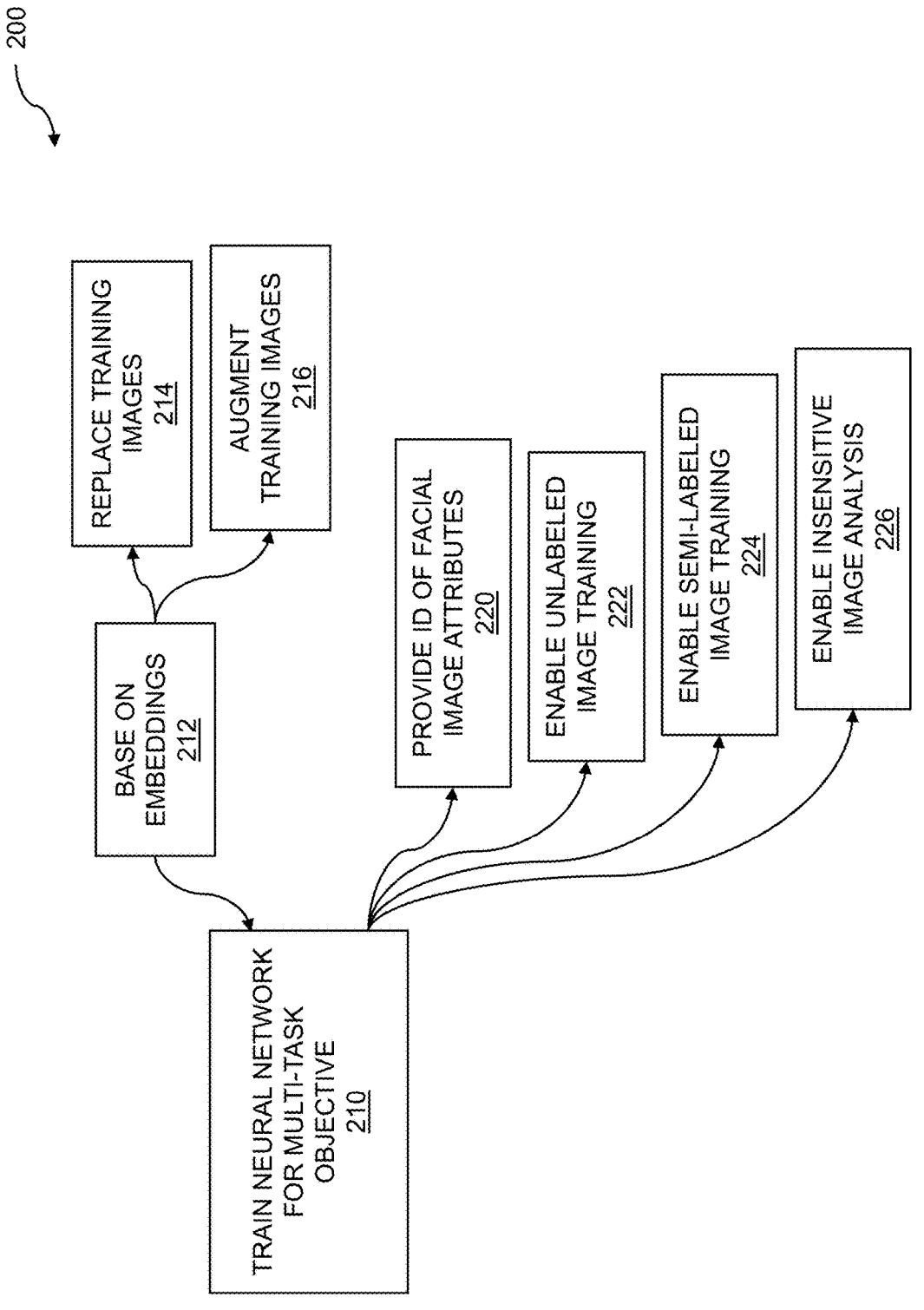
FIG. 2 is a flow diagram for neural network training.

FIG. 2 is a flow diagram for neural network training. A neural network can be formed by coupling together various types of layers. The layers can include one or more of input layers, hidden layers, and output layers. The hidden layers, which can be coupled between input layers and output layers, can include convolutional layers, bottleneck layers, pooling layers, activation layers, etc. The neural network can be configured to perform a wide variety of processing tasks such as image processing, audio processing, and so on. The neural network can also be configured for machine learning tasks. In order for the neural network to perform tasks for which it is intended, the neural network must be trained. The neural network can be trained by providing a dataset that comprises objects such as the ones the network is being trained to process and known results of successful processing of the objects. Training of the neural network improves when more training data is applied to the training. However, choosing training data and determining correct neural network responses to the training data is a painstaking process. To improve training of the neural network, synthetic data can be generated. The synthetic data can replace the traditional, "real" data, or can supplement it. Since the synthetic data can be generated automatically, substantially more training data can be generated and used for neural network training purposes. The neural network training is applied to a neural network multi-attribute facial encoder. A facial image is encoded for processing on a neural network. The facial image is encoded into two or more orthogonal feature subspaces, wherein the encoding is performed by a single, trained encoder, wherein the encoder is a downsampling encoder, wherein orthogonality of the feature subspaces is established using metrics, and wherein the orthogonality enables separability of the feature subspaces. Embeddings are generated for two or more attributes of the facial image, wherein the embeddings are generated using one or more copies of the single, trained encoder.

The flow 200 includes training 210 a neural network for a multi-task objective. The neural network that is trained can include a neural network configured as an encoder. A multi-task objective neural network can include a single neural network that can be configured to perform two or more tasks. In embodiments, the tasks can be based on configuring a neural network for encoding a facial image into two or more orthogonal feature subspaces. The configuring the neural network can be based on training the neural network to perform the encoding tasks. In the flow 200, the training is based on the embeddings 212. An embedding can include a structured representation of unstructured data. The embedding can be generated based on an attribute associated with data such as image data. The image data can include facial image data. The embedding can include a low-dimensional vector representation of higher-dimensional data such as unstructured data. The low-dimensional vector can include relationships within higher-dimensional image data. Similarities between data points in the higher-dimensional data can be included as distances between embedding vectors. Note that embeddings can be generated for attributes of a facial image.

Described above, a neural network can be trained by applying a dataset of known data such as known images and by comparing outputs from the neural network to expected results or inferences. Other datasets can be used to train the neural network. In embodiments, the embeddings can be used to train a neural network to recognize or infer attributes of a facial image. In the flow 200, the embeddings replace 214 training images. The embeddings can include vectors, where the vectors can include a number of elements such as 2048 elements. The vectors can be substantially smaller than the training images and can therefore train the neural network with less processing. In the flow 200, the embeddings augment 216 training images. The training dataset can include images within which various facial features can be included. Since the embeddings are generated based on attributes of a facial image, the embeddings can be used to supplement the training of the neural network to identify the desired attributes.

In the flow 200, the multi-task objective can provide identification 220 of the two or more attributes of the facial image. A variety of facial attributes within the image can be identified. In embodiments, the facial attributes can include identity, emotion, lighting, pose, or age. The identity can include facial recognition; presenting male, female, etc.; presence or absence of facial hair, facial coverings, glasses, and sunglasses; and so on. Lighting can include bright light, sunlight, artificial light, flat light, partial or complete shadow, etc. Pose can include head tilt, yaw (e.g., rotation left or right), pitch (e.g., rotation up or down), and so on. Age can include child or adult, young or old, and so on. In embodiments, an emotion feature subspace can include neutrality, anger, distrust, happiness, sadness, and/or surprise. In further embodiments, the emotions can include one or more of sadness, stress, frustration, confusion, disappointment, hesitation, cognitive overload, focusing, engagement, attention, boredom, exploration, confidence, trust, delight, skepticism, doubt, satisfaction, excitement, laughter, calmness, curiosity, humor, depression, envy, sympathy, embarrassment, poignancy, or mirth. In the flow 200, the encoding enables unlabeled facial image training 222. Unlabeled data can include data such as image data which has not been tagged with labels that can be used to designate or identify characteristics, properties, or classifications associated with the data. The unlabeled data can be used to train a neural network based on an unsupervised learning technique. Instead of using training that has been tagged and can be provided with expected results or inferences about the data, the machine learning network must instead form its own inferences about the data.

In the flow 200, the encoding enables semi-labeled facial image training 224. The semi-labeled facial image training can be used to accomplish semi-supervised training of the encoder neural network. Semi-supervised training can be based on the use of labeled data and unlabeled data. Different from supervised training in which a machine learning neural network processes labeled data to determine patterns and to uncover relationships between a target variable and a dataset, semi-supervised training can be based on "learning" by processing labeled and unlabeled data. Since the amount of labeled data is relatively small due to the amount of effort required to label the data, the use of both labeled and unlabeled enables a much larger dataset to be applied to the neural network learning/training process. In the flow 200, the embeddings can enable image analysis that is insensitive 226 to facial attributes such as lighting, pose, or gender. Recall that embeddings can include a structured representation of unstructured data, and that embeddings can be generated based on an attribute associated with data such as facial image data. The embeddings can include a low-dimensional vector representation of higher-dimensional data such as unstructured data. The low-dimensional vector can include relationships within higher-dimensional image data. Similarities between data points in the higher-dimensional data can be included as distances between embedding vectors. Discussed previously, the lighting can include light or shadow, bright light, flat light, and so on. The insensitive image analysis can proceed based on locations of facial regions or landmarks, the presence of absence of facial occlusions such as facial hair or sunglasses, and the like.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors. Various embodiments of the flow 200, or portions thereof, can be included on a semiconductor chip and implemented in special purpose logic, programmable logic, and so on.

Figure 3:
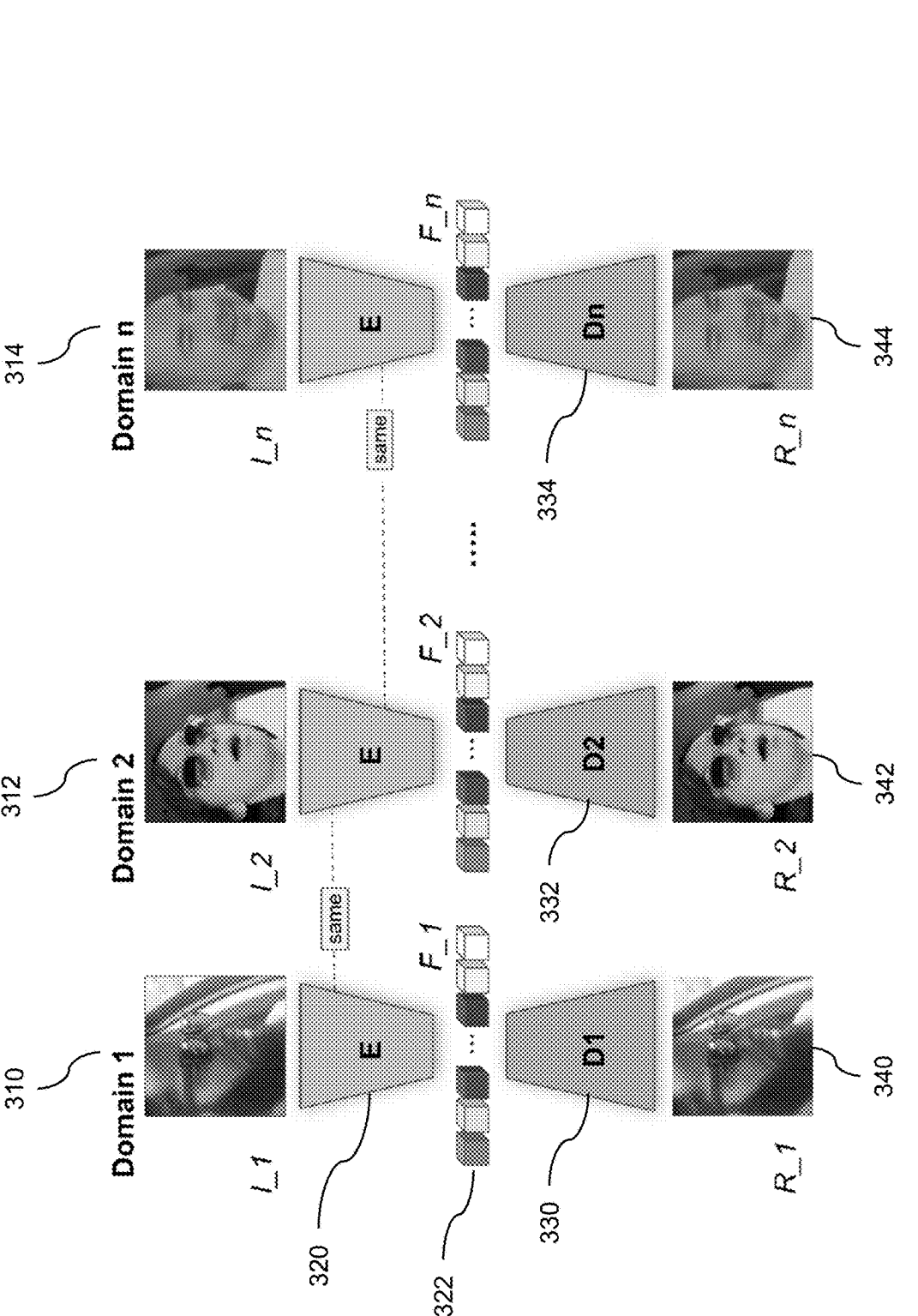
FIG. 3 illustrates a multi-attribute encoder paired with various decoders.

FIG. 3 illustrates a multi-attribute encoder paired with various decoders. Multi-attribute encoders can be used in a variety of machine learning neural networks. Multi-attribute facial encoders, for example, can be used to generate synthetic images, which can further be used to train and test encoder-decoder pairs. Synthetic images can be generated in order to provide images for training a neural network such as a machine learning neural network, to supplement real images such as facial images, and so on. The synthetic images can be generated and evaluated for realism, authenticity, and so on. The multi-attribute encoder can enable disentanglement of various feature spaces by evaluating the disentanglement loss. The disentanglement can enable self-supervision in a machine learning training environment by allowing the network to learn from unlabeled and/or semi-labeled training images from various source datasets. The disentanglement can also enable improved accuracy of labeled data, for example, making expressions independent and not sensitive to lighting, pose, gender, etc. In embodiments, the generated, disentangled feature vectors created from multiple images using one or more copies of a single, trained encoder can each be paired with one or more single decoders. The decoders (discussed below) can be based on a generative adversarial network (GAN) architecture. The rendering synthetic images is based on a neural network multi-attribute facial encoder. A facial image is obtained for processing on a neural network. The facial image is encoded into two or more orthogonal feature subspaces, wherein the encoding is performed by a single, trained encoder, wherein the encoder is a downsampling encoder, wherein orthogonality of the feature subspaces is established using metrics, and wherein the orthogonality enables separability of the feature subspaces. Embeddings are generated for two or more attributes of the facial image, wherein the embeddings are generated using one or more copies of the single, trained encoder.

A series of domains is shown 300. The domains can be associated with a diverse catalog or dataset of different attribute spaces. The attribute spaces can include one or more orthogonal feature subspaces encoded from facial images. Synthetic images can be rendered using features from different attribute spaces. The features can be processed through one or more upsampling decoders. The images resulting from the upsampling decoding can be used for a variety of tasks such as training dataset augmentation, de-identification of individuals within facial images, "puppeteering" in which a fake version of a person such as a celebrity is artificially generated, and so on. The domains can include domain 1 310, domain 2 312, domain n 314, and so on. The domains can include lighting, pose, gender, age, and so on. The domains can further include presence or absence of glasses such as sunglasses, presence or absence of facial hair, and the like. In embodiments, the domains can include one or more camera angles (e.g., yaw), camera types (e.g., rear-view mirror, center console), etc. Images can be selected from each of the domains such as images I_1, I_2, and I_n. The images can be selected at random, based on inclusion in a particular feature subspace, etc.

The images can be encoded using an encoder E 320. The encoder E, which can include a multi-attribute facial encoder, can be applied to each domain. The encoder can include a downsampling encoder. The encoder can be used to generate one or more feature vectors 322 such as feature vectors F_1, F_2, and F_n. Each of the feature vectors can include one or more features. In embodiments, the features or elements that can be associated with each feature vector can include one or more of identity, emotion, lighting, pose, age, and others. In embodiments, the combination of the features can be used for multi-domain, multi-attribute classification. The feature vectors can be expanded using one or more decoders. The one or more decoders can include upsampling decoders. In the figure, three decoders are shown. Decoder D1 330 can decode and upsample feature vector F_1; decoder D2 332 can decode and upsample feature vector F_2; and decoder Dn 334 can decode and upsample feature vector F_n. The results of the decoding and upsampling can include synthetic images. The synthetic images can be rendered. In the figure, rendered images that result from the decoding and upsampling can include rendered image R_1 340, rendered image R_2 342, and rendered image R n 344. Discussed previously and throughout, the synthetic images can be used for training a machine learning neural network. In embodiments, the synthetic images can be used to replace training images, to supplement training images, and so on.

Figure 4:
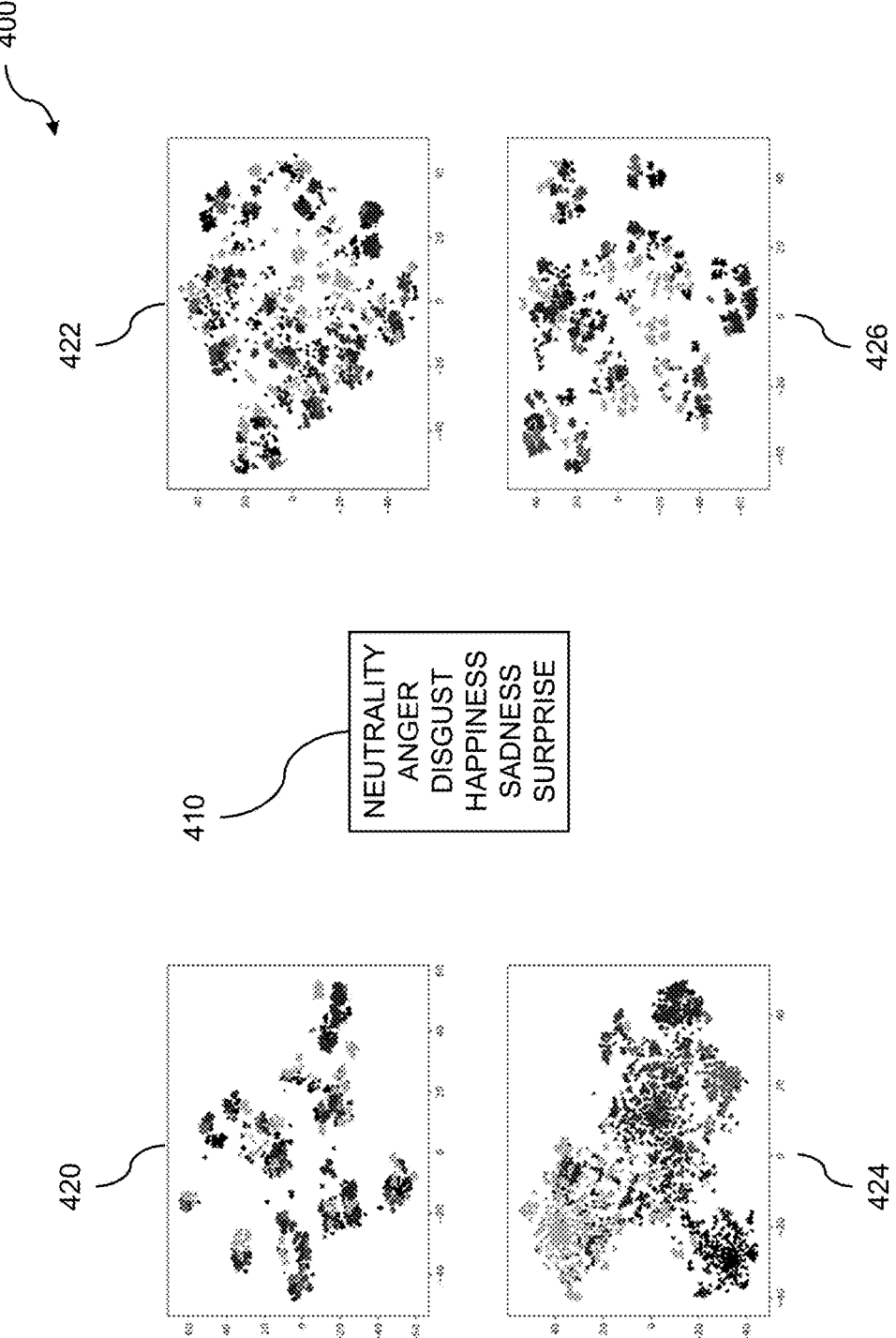
FIG. 4 illustrates t-distributed stochastic neighbor encoding of emotion labels.

FIG. 4 illustrates t-distributed Stochastic Neighbor Encoding (t-SNE) of emotion labels. An encoder can be used to encode feature subspaces associated with facial images of individuals. The t-distributed Stochastic Neighbor Encoding can be used to visualize feature subspaces by mapping a dataset of high-dimensionality, such as a dataset of facial images, to two or more dimensions. The mapping can include two or three dimensions. The low-dimensional mapping can be visualized by plotting the mapping results. The mapping can be based on a feature subspace. The spatial positioning of the plotted features in the low-dimensional encoding can be used to gauge resolution or disentanglement. For disentanglement, similar features can be clustered together when plotted. By contrast, mismatching feature and attribute labels should result in "imperfect" clustering. For imperfect clustering, the visualization can include a heterogeneous or spread-out rendering of points. The t-SNE visualization is enabled by a neural network multi-attribute facial encoder. A facial image is obtained for processing on a neural network. The facial image is encoded into two or more orthogonal feature subspaces, wherein the encoding is performed by a single, trained encoder, wherein the encoder is a downsampling encoder, wherein orthogonality of the feature subspaces is established using metrics, and wherein the orthogonality enables separability of the feature subspaces. Embeddings are generated for two or more attributes of the facial image, wherein the embeddings are generated using one or more copies of the single, trained encoder.

The figure illustrates t-SNE encoding 400 of emotion labels for six emotions 410. The six emotions can include neutrality, anger, disgust, happiness, sadness, and surprise. In embodiments, the emotions can include one or more of sadness, stress, frustration, confusion, disappointment, hesitation, cognitive overload, focusing, engagement, attention, boredom, exploration, confidence, trust, delight, skepticism, doubt, satisfaction, excitement, laughter, calmness, curiosity, humor, depression, envy, sympathy, embarrassment, poignancy, or mirth. The labels can further include cognitive states such as drowsiness, fatigue, distraction, and impairment. The t-SNE visualizations can include an identity attribute, as shown in t-SNE graph 420. The identity can be based on the encoder subspace tuned for identity. The clustering of the data in the two-dimensional graph indicates disentanglement. The t-SNE visualizations can include other unlabeled attributes, or "others", as shown in t-SNE graph 422. The t-SNE visualizations can include emotion attributes, as shown in t-SNE graph 424. The emotion visualization can be based on a universal facial encoder tuned to a variety of emotions. In embodiments, the emotion feature subspace can include neutrality, anger, distrust, happiness, sadness, and/or surprise. Other emotions can be included in the emotion feature subspace. While not shown, further feature spaces can be based on moods, mental states, cognitive states, and the like. The t-SNE visualizations can include emotions based on a quantized flattened model, as shown in t-SNE graph 426. The quantized flattened model results can be used for comparison with the universal facial encoder results shown in 424.

Figure 5:
FIG. 5 shows feature space t-SNE visualizations.
Figure 5:
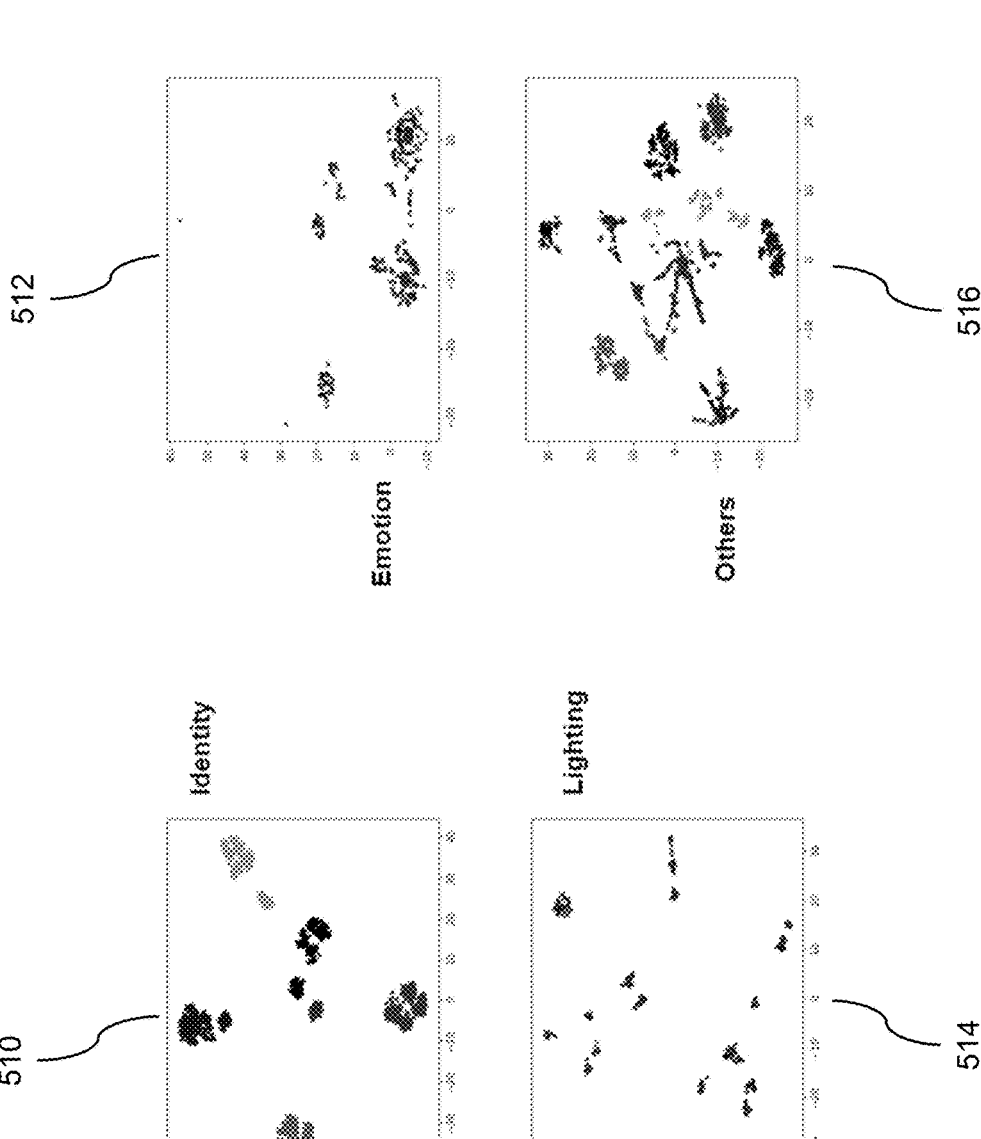

FIG. 5 shows feature space t-SNE visualizations. The t-distributed Stochastic Neighbor Encoding (t-SNE) is a non-linear technique for reducing dimensionality of high-dimensional datasets. The high-dimensional datasets can include image datasets, where the image datasets can include facial images. The t-SNE technique can be used to explore a high-dimensional dataset by mapping the dataset to two or more dimensions. The two or more dimensions can enable and enhance human observation of the dataset. The technique can enable identification of patterns that can be hidden in the data and can enable determination of whether the hidden pattern represents a signal or noise.

Facial images can be encoded into orthogonal feature subspaces, where the orthogonality of the subspaces can be based on metrics. In embodiments, the metrics used to gauge the orthogonality of the feature subspaces can be based on t-SNE. The low-dimensional dataset that results from applying a t-SNE technique to a high-dimensional dataset can be displayed. Embodiments further include generating a visual summary of encoder performance using the t-SNE. The visual summary can aid data pattern analysis. The feature space t-SNE visualizations are enabled by a neural network multi-attribute facial encoder. A facial image is obtained for processing on a neural network. The facial image is encoded into two or more orthogonal feature subspaces, wherein the encoding is performed by a single, trained encoder, wherein the encoder is a downsampling encoder, wherein orthogonality of the feature subspaces is established using metrics, and wherein the orthogonality enables separability of the feature subspaces. Embeddings are generated for two or more attributes of the facial image, wherein the embeddings are generated using one or more copies of the single, trained encoder.

FIG. 5 shows feature space visualizations based on reduced dataset dimensionality accomplished using a t-SNE technique 500. The visualizations can be used to evaluate a trained encoder such as an encoder used to encode images into two or more orthogonal feature subspaces. Recall that embeddings can be generated for attributes of a facial image. Spatial positioning of facial features in a low-dimensional embedding can be used to determine an extent of disentanglement. Herein, disentanglement is used to describe the extent to which similar features can be clustered together in the same facial attribute space while dissimilar or mismatching features and facial attribute labels can be imperfectly clustered. The figure presents an example of a two-dimensional embedding space using t-SNE identify features. The t-SNE identity features should generate tightly clustered data points that adhere to individual classes. Thus, clustering of the same identity labels should be tight, while clustering using different features such as emotion should result in irregular, visualized clusters. The latter clusters appear heterogeneous in terms of labeling color, icon, etc. The figure shows samples from six test subjects. Identity of the test subjects is used while clustering labels generate the t-SNE visualizations shown. The visualization can be generated by a trained universal facial encoder (UFE) engine. In the figure, identity features 510 are shown. The identity features can be tightly formed clusters or groupings. The remaining visualizations show embeddings from other attributes. In the example figure, other visualizations include emotion 512, lighting 514, and others 516. The clusters in the visualizations are heterogeneous, where the heterogeneous clusters can suggest that the clusters within visualizations 512, 514, and 516 are not tied to identity. In addition, the embeddings can imply cluster based on their spatial location within an embedding space. For example, the six clusters can represent six emotions.

Figure 6:
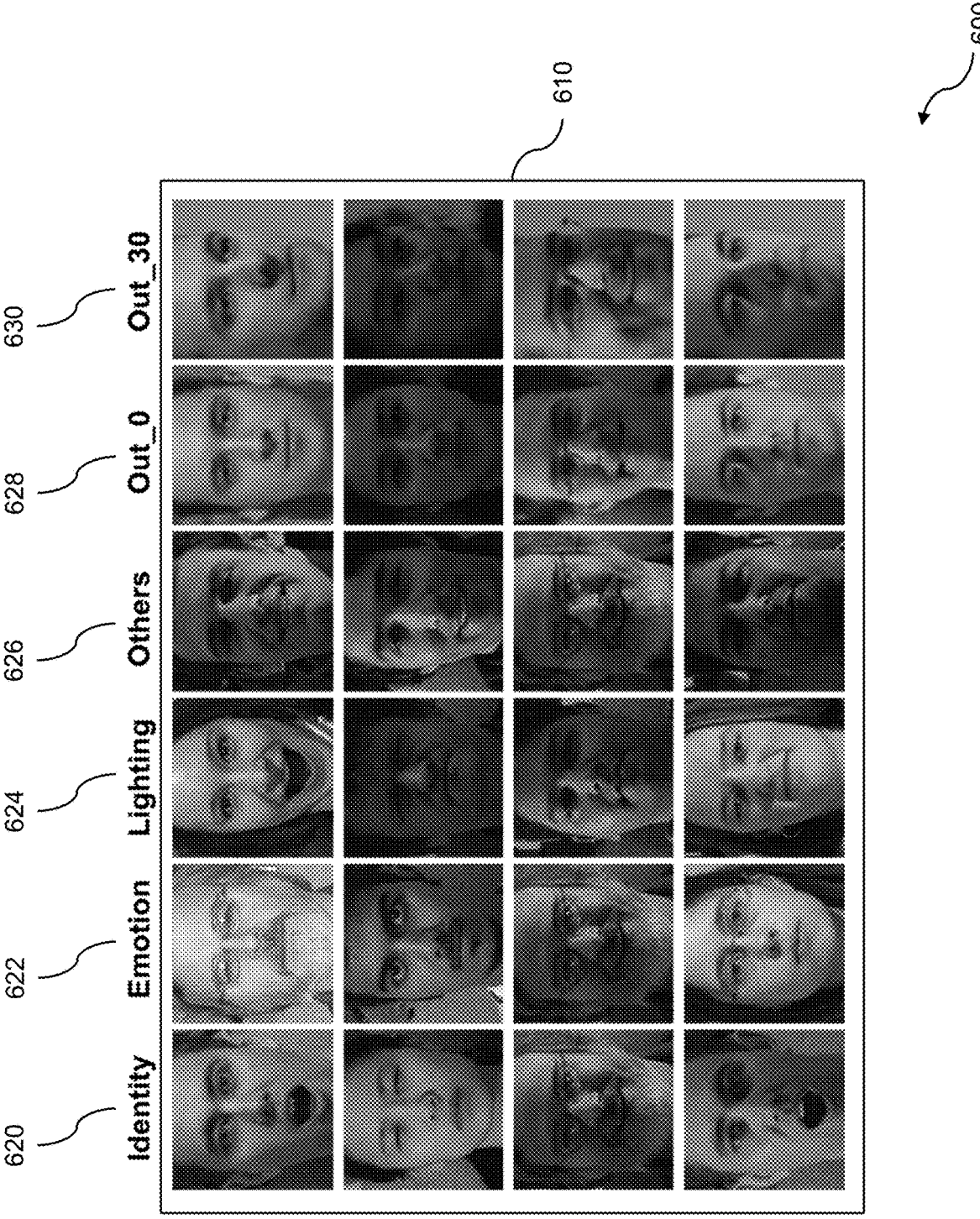
FIG. 6 illustrates compositing images.

FIG. 6 illustrates compositing images. Compositing images can be based on techniques where elements of two or more images can be combined into a new image. The elements from the two or more images can appear within portions or regions of the new image. In embodiments, new image samples can be generated in an image space by mixing, blending, or combining representations of two or more input images. Facial images that were obtained can be encoded into orthogonal feature subspaces. Embeddings can be generated for facial attributes of the facial images. The embeddings can enable image analysis that is insensitive to facial attributes, such as lighting, pose, or gender. The embeddings, which can include low-dimensionality versions of the high-dimensionality images, can be decoded. The decoding can include upsampling. Two or more decoders can be used to generate two or more hallucinations. Here and throughout, hallucinations can refer to a super-resolution technique. Since the mixed subspaces can generate low-resolution or noisy images, "hallucinations" can convert the low-resolution or noisy images such as facial images to high-resolution images. The conversion can be based on knowledge associated with facial features which can appear within the facial images. Compositing of images is based on a neural network multi-attribute facial encoder. A facial image is obtained for processing on a neural network. The facial image is encoded into two or more orthogonal feature subspaces, wherein the encoding is performed by a single, trained encoder, wherein the encoder is a downsampling encoder, wherein orthogonality of the feature subspaces is established using metrics, and wherein the orthogonality enables separability of the feature subspaces. Embeddings are generated for two or more attributes of the facial image, wherein the embeddings are generated using one or more copies of the single, trained encoder.

The figure shows compositing of images 600. A collection of images 610 can be used by a compositing technique to generate composite images. The images can include facial images obtained from a plurality of individuals. The images can represent a plurality of feature subspaces based on facial attributes. In embodiments, the facial attributes can include identity, emotion, lighting, pose, age, and so on. The facial images can include individuals representing genders, ethnicities, ages, and so on. The facial images can also include individuals who are wearing eyeglasses, eyepatches, facial coverings, facial hair, etc. The images can include facial images from the frontal domain (e.g., facing forward). The images can include individuals who present female, male, etc.; individuals who are white, black, indigenous, and people of color (BIPOC); one or more emotions; one or more lighting conditions; and so on. The images can be obtained from one or more feature subspaces or subdomains. In embodiments, the feature subspaces can include an identity 620 of one or more individuals. The identities, as well as additional feature subspaces discussed shortly, can be based on encoding of digital images. The identities can include individuals representing different genders and ethnicities. The identity images can include varying emotions or cognitive states, facial expressions, etc. The feature subspaces can include emotions 622. In embodiments, an emotion feature subspace can include neutrality, anger, distrust, happiness, sadness, and/or surprise.

The feature subspaces can include lighting 624. The lighting can include bright lighting, flat lighting, partial shade or shadow, high-contrast lighting, low-contrast lighting, and so on. The lighting can be provided by natural sources such as sunlight or moonlight, can be artificial lighting, etc. The feature subspaces can include "others" 626. The other feature subspace can include emotional or cognitive states, pose, age, and the like. The facial features can be combined and hallucinated. The hallucinated images can include composite images. The hallucinated results can include a facial yaw such as a yaw of zero degrees out_0 628 and a yaw of thirty degrees out_30 630. In the example images 610, one or more facial attributes can be encoded from a single image. The identity features can be determined based on a presumption about an individual within an image. The presumption can include gender, ethnicity, presence of eyeglasses, etc. In a usage example, each facial attribute can be determined for a given image while the identity can be based on a presumed Caucasian female, an Asian male, a BIPOC male, and so on. The identity features such as gender, ethnicity, presence of eyeglasses, etc., can be derived from the presumption about the individual within an image, while lighting and emotion can be mirrored from the additional images. Using this compositing technique, images containing a reposed face can be generated from a frontal face by altering pose information within a decoder.

Figure 7:
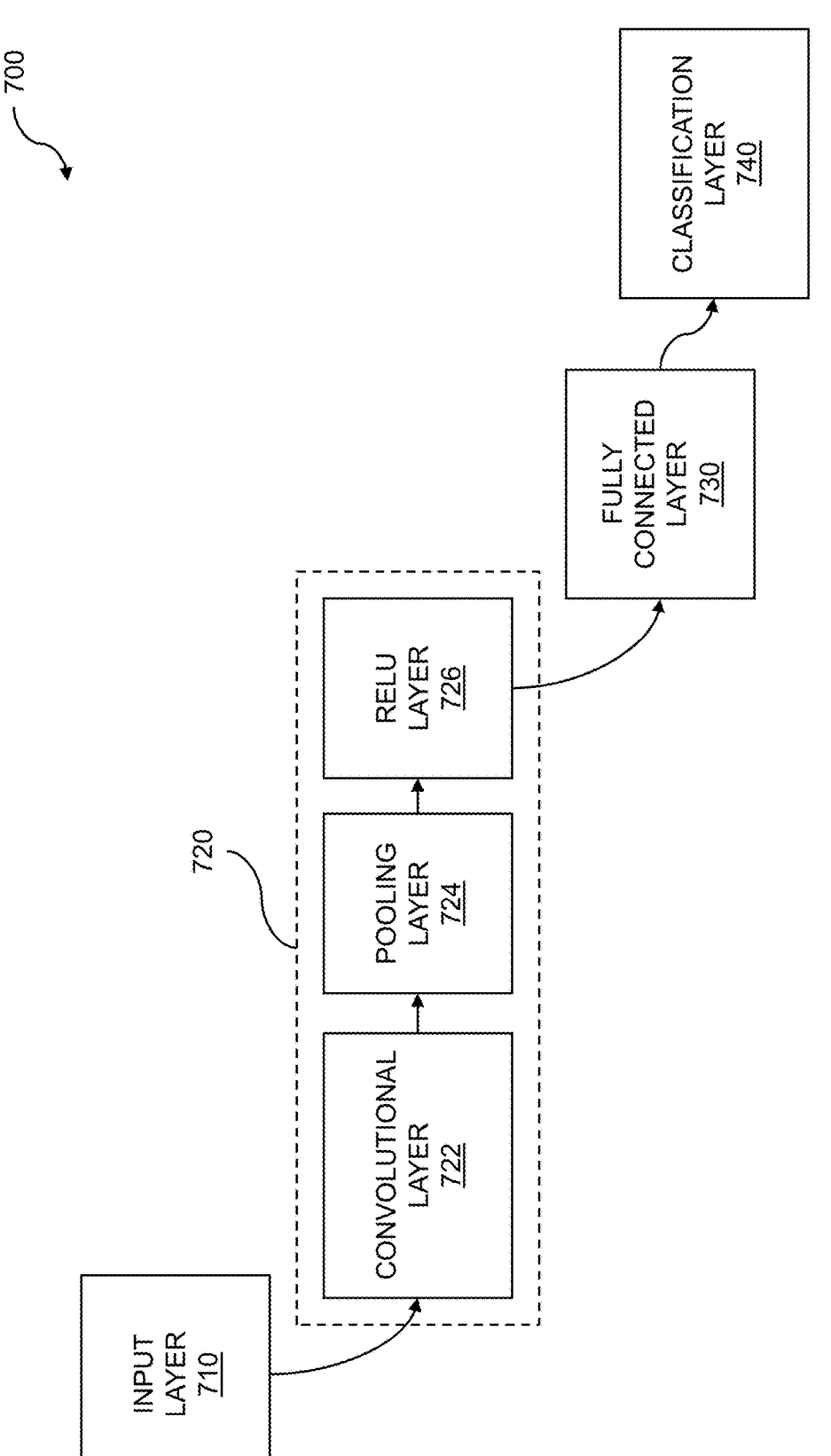
FIG. 7 is an example showing a convolutional neural network (CNN).

FIG. 7 is an example showing a convolutional neural network (CNN). A convolutional neural network, such as network 700, can be used for various applications. The applications for which the CNN can be used can include deep learning, where the deep learning can be applied a variety of analysis tasks such as facial image analysis, audio voice processing, natural language processing, and so on. The machine learning can be applied to a neural network multi-attribute facial encoder that can encode orthogonal feature subspaces. The convolutional neural network can be trained by applying a training dataset, such as a facial image training dataset, to the CNN. The training dataset can be augmented with synthetic data including synthetic images. The training dataset can be replaced by or augmented by embeddings. A facial image is obtained for processing on a neural network. The facial image is encoded into two or more orthogonal feature subspaces, wherein the encoding is performed by a single, trained encoder, wherein the encoder is a downsampling encoder, wherein orthogonality of the feature subspaces is established using metrics, and wherein the orthogonality enables separability of the feature subspaces. Embeddings are generated for two or more attributes of the facial image, wherein the embeddings are generated using one or more copies of the single, trained encoder. The CNN can be applied to various tasks such as facial recognition for identification of an individual, emotional and cognitive state determination, autonomous vehicle or semi-autonomous vehicle manipulation, vehicle content recommendations, and the like. When the imaging and other data collected includes cognitive state data, the cognitive state data can include mental processes, where the mental processes can include attention, creativity, memory, perception, problem solving, thinking, use of language, or the like.

Analysis, including cognitive analysis, facial expression analysis, and so on, is a very complex task. Understanding and evaluating moods, emotions, mental states, or cognitive states requires a nuanced evaluation of facial expressions or other cues generated by people. Cognitive state analysis is important in many areas such as research, psychology, business, intelligence, law enforcement, and so on. The understanding of cognitive states can be useful for a variety of business purposes, such as improving marketing analysis, assessing the effectiveness of customer service interactions and retail experiences, and evaluating the consumption of content such as movies and videos. Identifying points of frustration in a customer transaction can allow a company to address the causes of the frustration. By streamlining processes, key performance areas such as customer satisfaction and customer transaction throughput can be improved, resulting in increased sales and revenues. In a content scenario, producing compelling content that achieves the desired effect (e.g., fear, shock, laughter, etc.) can result in increased ticket sales and/or increased advertising revenue. If a movie studio is producing a horror movie, it is desirable to know if the scary scenes in the movie are achieving the desired effect. By conducting tests in sample audiences, and analyzing faces in the audience, a computer-implemented method and system can process thousands of faces to assess the cognitive state at the time of the scary scenes. In many ways, such an analysis can be more effective than surveys that ask audience members questions, since audience members may consciously or subconsciously change answers based on peer pressure or other factors. However, spontaneous facial expressions can be more difficult to conceal. Thus, by analyzing facial expressions en masse in real time, important information regarding the general cognitive state of the audience can be obtained.

Analysis of facial expressions is also a complex task. Image data, where the image data can include facial data, can be analyzed to identify a range of facial expressions. The facial expressions can include a smile, frown, smirk, and so on. The image data and facial data can be processed to identify the facial expressions. The processing can include analysis of expression data, action units, gestures, mental states, cognitive states, physiological data, and so on. Facial data as contained in the raw video data can include information on one or more of action units, head gestures, smiles, brow furrows, squints, lowered eyebrows, raised eyebrows, attention, and the like. The action units can be used to identify smiles, frowns, and other facial indicators of expressions. Gestures can also be identified, and can include a head tilt to the side, a forward lean, a smile, a frown, as well as many other gestures. Other types of data including physiological data can be collected, where the physiological data can be obtained using a camera or other image capture device, without contacting the person or persons. Respiration, heart rate, heart rate variability, perspiration, temperature, and other physiological indicators of cognitive state can be determined by analyzing the images and video data.

Deep learning is a branch of machine learning which seeks to imitate in software the activity which takes place in layers of neurons in the neocortex of the human brain. This imitative activity can enable software to "learn" to recognize and identify patterns in data, where the data can include digital forms of images, sounds, and so on. The deep learning software is used to simulate the large array of neurons of the neocortex. This simulated neocortex, or artificial neural network, can be implemented using mathematical formulas that are evaluated on processors. With the ever-increasing capabilities of the processors, increasing numbers of layers of the artificial neural network can be processed.

Deep learning applications include processing of image data, audio data, and so on. Image data applications include image recognition, facial recognition, etc. Image data applications can include differentiating dogs from cats, identifying different human faces, and the like. The image data applications can include identifying cognitive states, moods, mental states, emotional states, and so on from the facial expressions of the faces that are identified. Audio data applications can include analyzing audio such as ambient room sounds, physiological sounds such as breathing or coughing, noises made by an individual such as tapping and drumming, voices, and so on. The voice data applications can include analyzing a voice for timbre, prosody, vocal register, vocal resonance, pitch, loudness, speech rate, or language content. The voice data analysis can be used to determine one or more cognitive states, moods, mental states, emotional states, etc.

The artificial neural network, such as a convolutional neural network which forms the basis for deep learning, is based on layers. The layers can include an input layer, a convolutional layer, a fully connected layer, a classification layer, and so on. The input layer can receive input data such as image data, where the image data can include a variety of formats including pixel formats. The input layer can then perform processing tasks such as identifying boundaries of the face, identifying landmarks of the face, extracting features of the face, and/or rotating a face within the plurality of images. The convolutional layer can represent an artificial neural network such as a convolutional neural network. A convolutional neural network can contain a plurality of hidden layers within it. A convolutional layer can reduce the amount of data feeding into a fully connected layer. The fully connected layer processes each pixel/data point from the convolutional layer. A last layer within the multiple layers can provide output indicative of cognitive state. The last layer of the convolutional neural network can be the final classification layer. The output of the final classification layer can be indicative of the cognitive states of faces within the images that are provided to the input layer.

Deep networks, including deep convolutional neural networks, can be used for facial expression parsing. A first layer of the deep network includes multiple nodes, where each node represents a neuron within a neural network. The first layer can receive data from an input layer. The output of the first layer can feed to a second layer, where the latter layer also includes multiple nodes. A weight can be used to adjust the output of the first layer which is being input to the second layer. Some layers in the convolutional neural network can be hidden layers. The output of the second layer can feed to a third layer. The third layer can also include multiple nodes. A weight can adjust the output of the second layer which is being input to the third layer. The third layer may be a hidden layer. Outputs of a given layer can be fed to the next layer. Weights adjust the output of one layer as it is fed to the next layer. When the final layer is reached, the output of the final layer can be a facial expression, a cognitive state, a mental state, a characteristic of a voice, and so on. The facial expression can be identified using a hidden layer from the one or more hidden layers. The weights can be provided on inputs to the multiple layers to emphasize certain facial features within the face. The convolutional neural network can be trained to identify facial expressions, voice characteristics, etc. The training can include assigning weights to inputs on one or more layers within the multilayered analysis engine. One or more of the weights can be adjusted or updated during training. The assigning weights can be accomplished during a feed-forward pass through the multilayered neural network. In a feed-forward arrangement, the information moves forward from the input nodes, through the hidden nodes, and on to the output nodes. Additionally, the weights can be updated during a backpropagation process through the multilayered analysis engine.

Returning to the figure, FIG. 7 is an example showing a convolutional neural network 700. The convolutional neural network can be used for deep learning, where the deep learning can be applied to image analysis for human perception artificial intelligence. The deep learning system can be accomplished using a variety of networks. In embodiments, the deep learning can be performed using a convolutional neural network. Other types of networks or neural networks can also be used. In other embodiments, the deep learning can be performed using a recurrent neural network. The deep learning can accomplish upper torso identification, facial recognition, analysis tasks, etc. The network includes an input layer 710. The input layer 710 receives image data. The image data can be input in a variety of formats, such as JPEG, TIFF, BMP, and GIF. Compressed image formats can be decompressed into arrays of pixels, wherein each pixel can include an RGB tuple. The input layer 710 can then perform processing such as identifying boundaries of the face, identifying landmarks of the face, extracting features of the face, and/or rotating a face within the plurality of images.

The network includes a collection of intermediate layers 720. The multilayered analysis engine can include a convolutional neural network. Thus, the intermediate layers can include a convolutional layer 722. The convolutional layer 722 can include multiple sublayers, including hidden layers, within it. The output of the convolutional layer 722 feeds into a pooling layer 724. The pooling layer 724 performs a data reduction, which makes the overall computation more efficient. Thus, the pooling layer reduces the spatial size of the image representation to reduce the number of parameters and computations in the network. In some embodiments, the pooling layer is implemented using filters of size 2×2, applied with a stride of two samples for every depth slice along both width and height, resulting in a reduction of 75-percent of the downstream node activations. The multilayered analysis engine can further include a max pooling layer 724. Thus, in embodiments, the pooling layer is a max pooling layer, in which the output of the filters is based on a maximum of the inputs. For example, with a 2×2 filter, the output is based on a maximum value from the four input values. In other embodiments, the pooling layer is an average pooling layer or L2-norm pooling layer. Various other pooling schemes are possible.

The intermediate layers can include a Rectified Linear Units (RELU) layer 726. The output of the pooling layer 724 can be input to the RELU layer 726. In embodiments, the RELU layer implements an activation function such as $f(x)-\max(0,x)$, thus providing an activation with a threshold at zero. In some embodiments, the RELU layer 726 is a leaky RELU layer. In this case, instead of the activation function providing zero when x<0, a small negative slope is used, resulting in an activation function such as $f(x)=1(x<0)(\alpha x)+1(x>=0)(x)$. This can reduce the risk of "dying RELU" syndrome, where portions of the network can be "dead" with nodes/neurons that do not activate across the training dataset. The image analysis can comprise training a multilayered analysis engine using the plurality of images, wherein the multilayered analysis engine can include multiple layers that comprise one or more convolutional layers 722 and one or more hidden layers, and wherein the multilayered analysis engine can be used for emotional analysis.

The example 700 includes a fully connected layer 730. The fully connected layer 730 processes each pixel/data point from the output of the collection of intermediate layers 720. The fully connected layer 730 takes all neurons in the previous layer and connects them to every single neuron it has. The output of the fully connected layer 730 provides input to a classification layer 740. The output of the classification layer 740 provides a facial expression and/or cognitive state as its output. Thus, a multilayered analysis engine such as the one depicted in FIG. 7 processes image data using weights, models the way the human visual cortex performs object recognition and learning, and effectively analyzes image data to infer facial expressions and cognitive states.

Machine learning for generating parameters, analyzing data such as facial data and audio data, and so on can be based on a variety of computational techniques. Generally, machine learning can be used for constructing algorithms and models. The constructed algorithms, when executed, can be used to make a range of predictions relating to data. The predictions can include whether an object in an image is a face, a box, or a puppy; whether a voice is female, male, or robotic; whether a message is legitimate email or a "spam" message; and so on. The data can include unstructured data and can be of large quantity. The algorithms that can be generated by machine learning techniques are particularly useful to data analysis because the instructions that comprise the data analysis technique do not need to be static. Instead, the machine learning algorithm or model, generated by the machine learning technique, can adapt. Adaptation of the learning algorithm can be based on a range of criteria such as success rate, failure rate, and so on. A successful algorithm is one that can adapt—or learn—as more data is presented to the algorithm. Initially, an algorithm can be "trained" by presenting it with a set of known data (supervised learning). Another approach, called unsupervised learning, can be used to identify trends and patterns within data. Unsupervised learning is not trained using known data prior to data analysis.

Reinforced learning is an approach to machine learning that is inspired by behaviorist psychology. The underlying premise of reinforced learning (also called reinforcement learning) is that software agents can take actions in an environment. The actions that are taken by the agents should maximize a goal such as a "cumulative reward". A software agent is a computer program that acts on behalf of a user or other program. The software agent is implied to have the authority to act on behalf of the user or program. The actions taken are decided by action selection to determine what to do next. In machine learning, the environment in which the agents act can be formulated as a Markov decision process (MDP). The MDPs provide a mathematical framework for modeling of decision making in environments where the outcomes can be partly random (stochastic) and partly under the control of the decision maker. Dynamic programming techniques can be used for reinforced learning algorithms. Reinforced learning is different from supervised learning in that correct input/output pairs are not presented, and suboptimal actions are not explicitly corrected. Rather, online or offline performance is the focus. Online performance includes finding a balance between exploration of new (uncharted) territory or spaces and exploitation of current knowledge. That is, there is a tradeoff between exploration and exploitation.

Machine learning based on reinforced learning adjusts or learns based on learning an action, a combination of actions, and so on. An outcome results from taking an action. Thus, the learning model, algorithm, etc., learns from the outcomes that result from taking the action or combination of actions. The reinforced learning can include identifying positive outcomes, where the positive outcomes are used to adjust the learning models, algorithms, and so on. A positive outcome can be dependent on a context. When the outcome is based on a mood, emotional state, mental state, cognitive state, etc., of an individual, then a positive mood, emotion, mental state, or cognitive state can be used to adjust the model and the algorithm. Positive outcomes can include the person being more engaged, where engagement is based on affect, the person spending more time playing an online game or navigating a webpage, the person converting by buying a product or service, and so on. The reinforced learning can be based on exploring a solution space and adapting the model, algorithm, etc., which stems from outcomes of the exploration. When positive outcomes are encountered, the positive outcomes can be reinforced by changing weighting values within the model, algorithm, etc. Positive outcomes may result in increased weighting values. Negative outcomes can also be considered, where weighting values may be reduced or otherwise adjusted.

Figure 8:
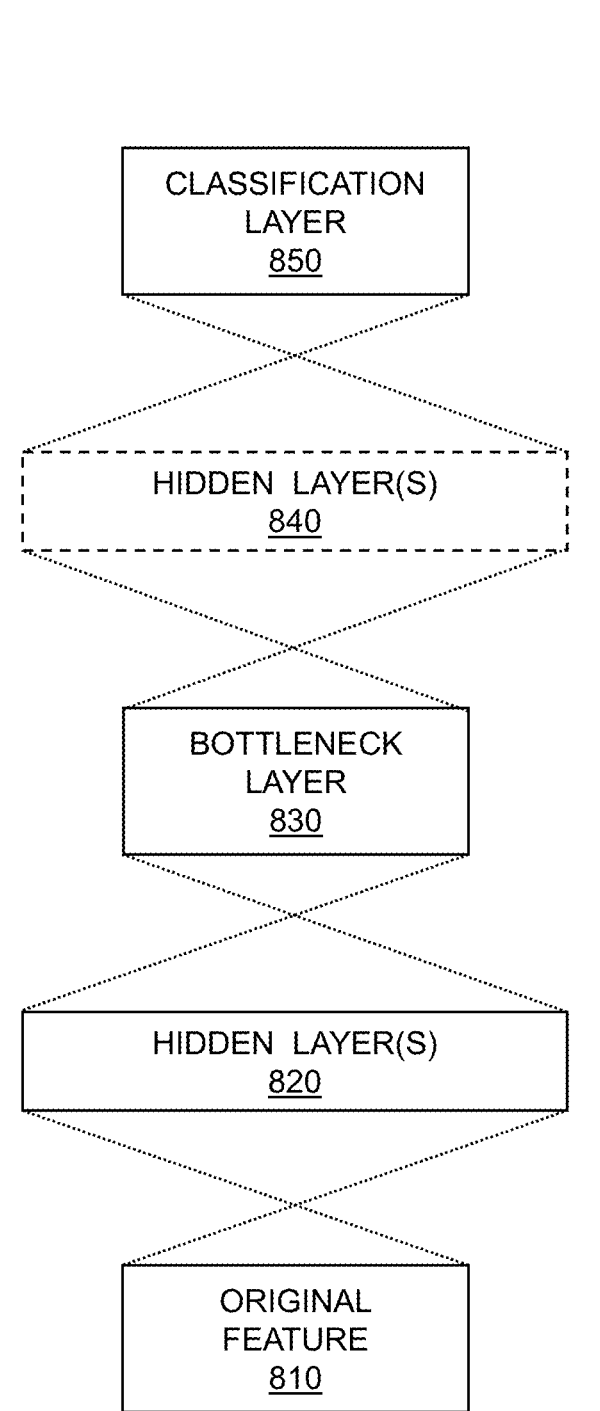
FIG. 8 illustrates a bottleneck layer within a deep learning environment.

FIG. 8 illustrates a bottleneck layer within a deep learning environment. The deep learning environment can include a machine learning system, where the machine learning system can be based on a neural network such as a deep neural network. The deep neural network comprises a plurality of layers such as input layers, output layers, convolutional layers, residual block layers, pixel shuffling layers, activation layers, and so on. The plurality of layers in a deep neural network (DNN) can include a bottleneck layer. The bottleneck layer can be used for neural network training, where the training can be applied to a neural network synthesis architecture using encoder-decoder models. The neural network that is trained can be applied to analysis such as image analysis of facial images for facial elements, audio analysis, physiological analysis, etc. A deep neural network can apply classifiers such as object classifiers, image classifiers, facial classifiers, facial expression classifiers, audio classifiers, speech classifiers, physiological classifiers, and so on. The classifiers can be learned by analyzing one or more of facial elements, emotional states, cognitive states, cognitive load metrics, interaction metrics, etc. The bottleneck layer can enable a neural network multi-attribute facial encoder. A facial image is obtained for processing on a neural network. The facial image is encoded into two or more orthogonal feature subspaces, wherein the encoding is performed by a single, trained encoder, wherein the encoder is a downsampling encoder, wherein orthogonality of the feature subspaces is established using metrics, and wherein the orthogonality enables separability of the feature subspaces. Embeddings are generated for two or more attributes of the facial image, wherein the embeddings are generated using one or more copies of the single, trained encoder.

Layers of a deep neural network can include a bottleneck layer 800. A bottleneck layer can be used for a variety of applications such as identification of a facial portion, identification of an upper torso, facial recognition, voice recognition, emotional state recognition, and so on. The deep neural network in which the bottleneck layer is located can include a plurality of layers. The plurality of layers can include an original feature layer 810. A feature such as an image feature can include points, edges, objects, boundaries between and among regions, properties, and so on. The deep neural network can include one or more hidden layers 820. The one or more hidden layers can include nodes, where the nodes can include nonlinear activation functions and other techniques. The bottleneck layer can be a layer that learns translation vectors to transform a neutral face to an emotional or expressive face. In some embodiments, the translation vectors can transform a neutral sounding voice to an emotional or expressive voice. Specifically, activations of the bottleneck layer determine how the transformation occurs. A single bottleneck layer can be trained to transform a neutral face or voice to a different emotional face or voice. In some cases, an individual bottleneck layer can be trained for a transformation pair. At runtime, once the user's emotion has been identified and an appropriate response to it can be determined (mirrored or complementary), the trained bottleneck layer can be used to perform the needed transformation.

The deep neural network can include a bottleneck layer 830. The bottleneck layer can include a fewer number of nodes than the one or more preceding hidden layers. The bottleneck layer can create a constriction in the deep neural network or other network. The bottleneck layer can force information that is pertinent to a classification, for example, into a low dimensional representation. The bottleneck features can be extracted using an unsupervised technique. In other embodiments, the bottleneck features can be extracted using a supervised technique. The supervised technique can include training the deep neural network with a known dataset. The features can be extracted from an autoencoder such as a variational autoencoder, a generative autoencoder, and so on. The deep neural network can include hidden layers 840. The number of hidden layers can include zero hidden layers, one hidden layer, a plurality of hidden layers, and so on. The hidden layers following the bottleneck layer can include more nodes than the bottleneck layer. The deep neural network can include a classification layer 850. The classification layer can be used to identify the points, edges, objects, boundaries, and so on described above. The classification layer can be used to identify cognitive states, mental states, emotional states, moods, and the like. The output of the final classification layer can be indicative of the emotional states of faces within the images, where the images can be processed using the deep neural network.

Figure 9:
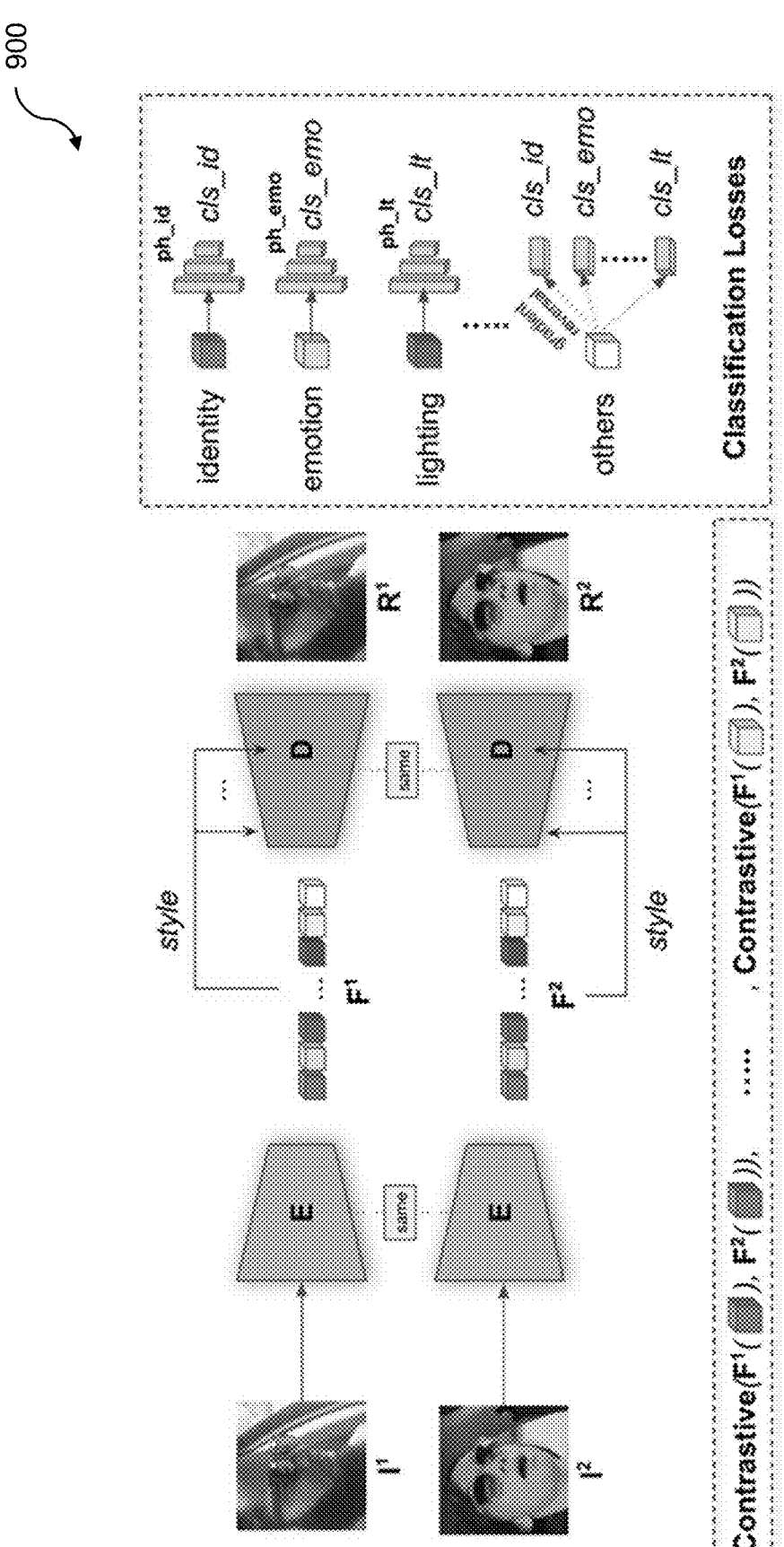
FIG. 9 illustrates a multi-attribute encoder paired with a multi-attribute decoder.

FIG. 9 illustrates a multi-attribute encoder paired with a multi-attribute decoder. The UFE framework shown 900 has one or more instantiations of a single encoder E and a matching one or more instantiations of a single decoder D that can take face images from different domains $I^1$ and $I^2$ and generate multi-attribute representations $F^1$ and $F^2$ respectively. Each attribute element (e.g., ID) in this representation is classified using prediction heads (ph), while smoother, pairwise relationships across attributes can be gleaned from contrastive learning. The representations also act as the guiding style for reconstructions $R^1$ and $R^2$ using D.

The UFE framework 900 architecture includes a single, downsampling residual encoder E that takes in a face image I and generates one-dimensional (1D) feature vectors $F=[f_{a1}, f_{a2}, f_{a3}, \ldots, f_{an}]$ pertaining to attributes a1 to an. A combination of these features, generated from face images collected from different domains (e.g., camera type/position or dataset) can be used for multi-domain, multi-attribute classification. The individual features in the encoder are separately generated from the residual maps, normalized to maintain conformity in value range. Once the feature vectors are extracted, the classification is done using individual prediction heads ph for each attribute space (e.g., $ph_{ak}$ for the k-th attribute). Thus, ph is designed as lightweight dense layers to map the feature $f'_{ak}$ to the corresponding label $I'_{ak}$ for i-th sample in the k-th attribute subspace.

Finally, a combination of these features $[f_{a1}, f_{a2}, f_{a3}, \ldots, f_{ak}, \ldots, f_{an}]$ is fed to a style-based upsampling decoder D to reconstruct I. While an ensemble of decoders could be trained for this task, where each decoder is assigned to a particular domain (e.g., camera position, facial pose, subject identity, or dataset association), concepts disclosed herein allow making E domain agnostic. Therefore, a single D is used and the gradient for domain invariance is utilized. Note that multiple instantiations may be used for increased throughput and efficiency. Thus, some embodiments further comprise pairing the one or more copies of the single, trained encoder with one or more copies of a single decoder. In embodiments, the single decoder is an upsampling decoder. In embodiments, the single decoder is targeted for multiple attribute subspaces. Some embodiments further comprise feeding the embeddings to the one or more copies of the single decoder for input reconstruction into pixel space, that is, embeddings can be input into one or more copies of the single decoder to reconstruct a pixel-based image using only the embeddings. Alternatively, an unlabeled sample image can be used to create a brand new, generative image by feeding it into the single decoder along with one or more embeddings. Therefore, some embodiments further comprise creating synthetic images, based on the embeddings, the single decoder, and an unlabeled sample image.

Figure 10:
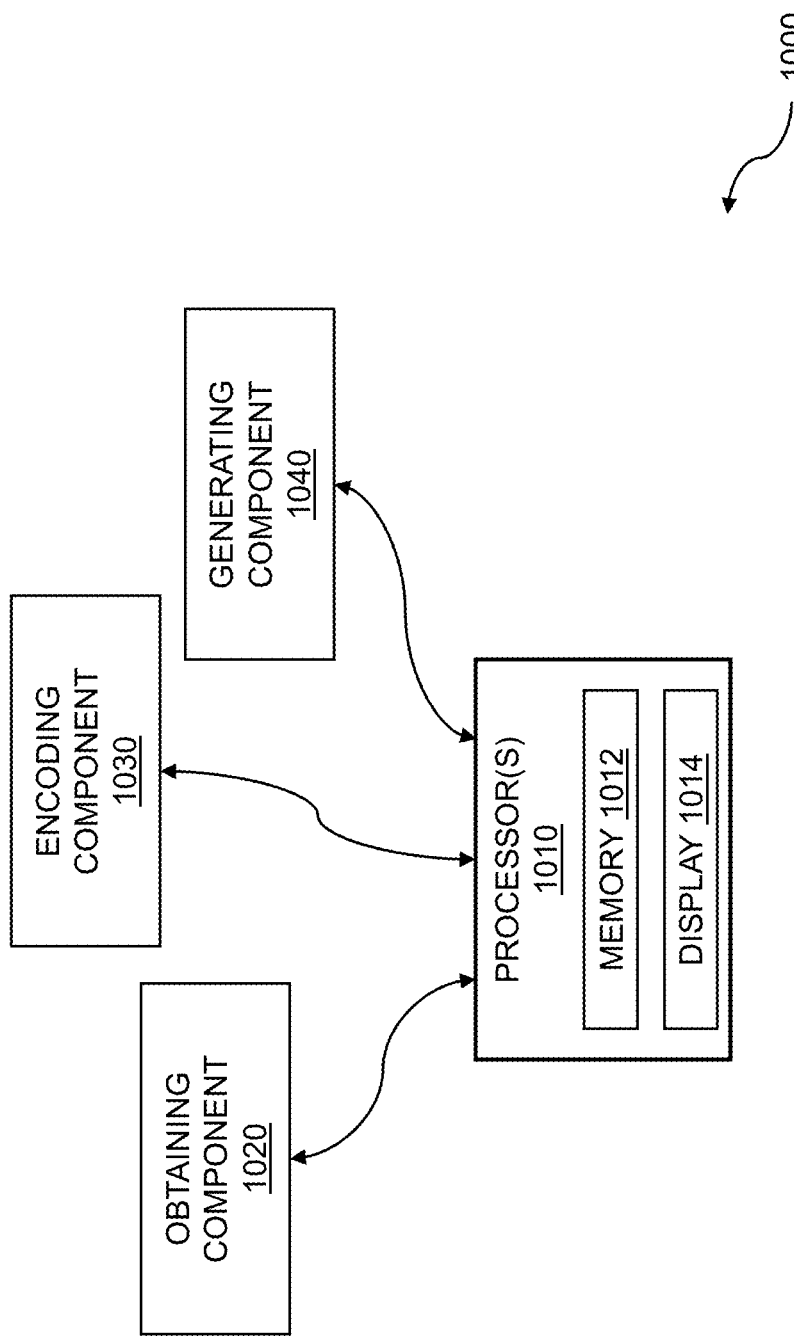
FIG. 10 is a system diagram for a neural network multi-attribute facial encoder and decoder.

FIG. 10 is a system diagram for a neural network multi-attribute facial encoder. Images such as facial images can be obtained from individuals who are involved in a variety of activities. Facial encoding can be used to represent a face within in an image, where the representation can be based on measurements. The measurements, which can include 128 measurements, can be used to determine facial attributes associated with the face, such as eye size, color, rotation, and so on. The facial attributes can be associated with an individual operating a vehicle. An individual who is operating a vehicle must perform many tasks associated with vehicle operation. The vehicle operator monitors their vehicle speed, road conditions, positions and relative speeds of other vehicles, road hazards, etc. In addition, the vehicle operator may be adjusting climate control settings, following travel route directions, selecting their favorite urban rush-hour soundtrack, and so on. As a result, the vehicle operator can gaze in a variety of directions including forward from the vehicle to monitor travel route, from side to side from the vehicle to maintain vehicle position within a lane, to track other vehicles, etc. The operator can further be viewing screens and adjusting settings within the vehicle. Facial encoding can be used to determine vehicle operation gaze direction, emotional or cognitive state, etc.

Facial attributes can be determined for the individuals while they are engaging with digital devices, consuming media, operating vehicles, and so on. The facial attributes can be used to determine an identity of one or more emotions or cognitive states associated with the individual, and so on. The identity of the individual can be used to obtain access to devices or media, to operate a vehicle, and the like, while emotional or cognitive states can be used to recommend media content, travel routes, and the like. The mental or cognitive states can further be used to permit vehicle access and operation, to convert vehicle operation from manual to autonomous or semiautonomous operation, etc. A machine learning system can enable a multi-attribute facial encoder. The system 1000 can include one or more processors 1010 and a memory 1012 which stores instructions. The memory 1012 is coupled to the one or more processors 1010, wherein the one or more processors 1010 can execute instructions stored in the memory 1012. The memory 1012 can be used for storing instructions, one or more images, one or more facial images, encoder data, feature space data, emotional and cognitive state data, and the like. The images, encoder data, feature space data, etc. can be shown on a display 1014 connected to the one or more processors 1010. The display can comprise a television monitor, a projector, a computer monitor (including a laptop screen, a tablet screen, a netbook screen, and the like), a smartphone display, a mobile device, or another electronic display.

The system 1000 can include an obtaining component 1020. The obtaining component 1020 can obtain a facial image for processing on a neural network. The facial image can include RGB image data, infrared (IR) image data, near-infrared (NIR) image data, and so on. The neural network can be implemented on a machine learning system. The neural network can be trained to process the facial image based on known image data and expected results and inferences for the known image data. The training data can include real image data, synthetic image data, and the like. In embodiments, synthetic image data can be generated using a generative adversarial network (GAN). The facial image can include a facial image from a plurality of facial images that comprises the training dataset. The facial images training dataset can be provided by or uploaded by a user, downloaded over a network from a library or repository, etc. The facial image can include one or more facial expressions. The facial expressions can include a smile, frown, or smirk; an eyebrow furrow; and so on. The facial image can include lighting attributes. The facial expressions can comprise human facial features associated with inattention, drowsiness, sleep, distraction, and the like. The facial expressions can convey one or more cognitive states. The facial expressions can indicate happy, disgusted, angry, fearful, surprised, sad, and so on. The neural network that can be trained using the facial images training dataset can include a deep learning (DL) neural network, a convolutional neural network (CNN), a recurrent neural network (RNN), and the like. In embodiments, the neural network that is trained can comprise a convolutional neural network or a recurrent neural network within a machine learning system. The machine learning system can be accomplished using an integrated circuit or chip; a computer such as a laptop or desktop computer; a personal electronic device such as a smartphone, tablet, or personal digital assistant (PDA), etc. The semiconductor chip can include a standalone chip, a subsystem of a chip, a module of a multi-chip module (MCM), a system on chip (SOC), and so on. The semiconductor chip can include a programmable chip such as a programmable logic array (PLA), a programmable logic device (PLD), a field programmable gate array (FPGA), a read only memory (ROM), and so on. The semiconductor chip can include a full-custom chip design. The semiconductor chip can be reprogrammed, reconfigured, etc., "on the fly", in the field, or at any time convenient to the user of the semiconductor chip. The semiconductor chip can be implemented in any semiconductor technology. The machine learning system can include a convolutional neural network (CNN). In other embodiments, a machine learning system can include a multi-layer perceptron. A perceptron can include an algorithm, based on supervised learning, that can be used for learning classifiers.

The system 1000 can include an encoding component 1030. The encoding component 1030 can encode the facial image into two or more orthogonal feature subspaces, wherein the encoding is performed by a single, trained encoder, wherein the encoder is a downsampling encoder, wherein orthogonality of the feature subspaces is established using metrics, and wherein the orthogonality enables separability of the feature subspaces. An encoder can be used to generate an encoded version of data such as image data. The encoded version of the data can have a lower or reduced dimensionality in comparison to the unencoded data. The encoder can be used to detect features within the image. The features can be based on facial attributes and can include identity, emotional state, cognitive state, and so on. The encoder can be used to generate orthogonal features spaces. That is, if a feature from an attribute were to be used as data for prediction of a second attribute, then the results would be substantially zero. Discussed previously, the encoder can include a downsampling encoder, where the encoded version of an image contains less data than the original image. The metrics that can be used to determine orthogonality of one or more feature spaces can be based on one or more values, percentages, threshold values, and the like. The metrics can further be based on comparing the original image to a version of the image regenerated from the encoded version of the image. The separability of the feature subspaces can be used to reduce computational complexity by enabling analysis of feature subspaces to be accomplished separately.

In embodiments, the encoding enables unlabeled facial image training. Unlabeled facial image data can include facial image data that has not previously been tagged with identifying characteristics, properties, classifications, etc., that can be associated with the data. The unlabeled data can be used to perform unsupervised or exploratory training of a neural network for machine learning. In other embodiments, the encoding enables semi-labeled facial image training. The semi-labeled facial image data can include labels associated with gender, age, or race; presence or absence of glasses, eye coverings, or patches; presence or absence of facial hair such as beards or mustaches; etc. The semi-labeled facial image data can include labels associated with tilt or rotation of the face, a partially occluded face, and the like. In further embodiments, the encoder normalizes features using sigmoid activation. An activation function can be used to determine whether data provided to an input of neuron in a layer of a neural network will be transferred via an output of the neuron to the next layer of the neural network. The activation function can further be used to enhance neural network convergence on a result or inference. A sigmoid function can be used as an activation function to ensure that the output of a neuron will be between zero and one. Other activation functions, such as a binary step function, a linear function, a hyperbolic tangent function, a rectified linear unit (ReLU) function, etc. can be used.

The system 1000 can include a generating component 1040. The generating component 1040 can generate embeddings for two or more attributes of the facial image, wherein the embeddings are generated using one or more copies of the single, trained encoder. An embedding can be a structured representation of a large dataset. The large dataset can include unstructured data such as facial image data. An embedding can be learned based on training such as supervised training of a neural network. In embodiments, the embeddings can include a vector representation of the two or more attributes of the facial image. The vectors can be significantly smaller than the original facial images. The embeddings can be used for training a neural network. In embeddings, the embeddings can replace training images. The embeddings can be used in place of tagged or analyzed facial images, synthetic facial images generated by a GAN, etc. In other embodiments, the embeddings can augment training images. The embeddings enhance neural network training by enhancing convergence on trained weights and biases associated with the neural network. Further embodiments can include training a neural network for a multi-task objective, where the training is based on the embeddings. The multi-task objective can include identifying attributes such as identity of an individual within a facial image, determining an emotion, identifying a cognitive state, and so on. In embodiments, the embeddings enable image analysis that is insensitive to lighting, pose, or gender. The embedding can enable image analysis of images obtained in bright light, low light, or shaded light conditions, etc. The image analysis can be enabled by the embeddings irrespective of whether the individual within the image is looking straight on, to the side, up, or down; has their head tilted or rotated (e.g., a three-quarter, half, or quarter facial view); and the like. The embeddings can enable image analysis based on facial landmarks, regions, etc. to be insensitive to gender.

The system 1000 can enable a computer system for machine learning comprising: a memory which stores instructions; one or more processors coupled to the memory wherein the one or more processors, when executing the instructions which are stored, are configured to: obtain a facial image for processing on a neural network; encode the facial image into two or more orthogonal feature subspaces, wherein the encoding is performed by a single, trained encoder, wherein the encoder is a downsampling encoder, wherein orthogonality of the feature subspaces is established using metrics, and wherein the orthogonality enables separability of the feature subspaces; and generate embeddings for two or more attributes of the facial image, wherein the embeddings are generated using one or more copies of the single, trained encoder.

The system 1000 can include a computer program product embodied in a non-transitory computer readable medium for machine learning, the computer program product comprising code which causes one or more processors to perform operations of: obtaining a facial image for processing on a neural network; encoding the facial image into two or more orthogonal feature subspaces, wherein the encoding is performed by a single, trained encoder, wherein the encoder is a downsampling encoder, wherein orthogonality of the feature subspaces is established using metrics, and wherein the orthogonality enables separability of the feature subspaces; and generating embeddings for two or more attributes of the facial image, wherein the embeddings are generated using one or more copies of the single, trained encoder.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method for machine learning comprising:

obtaining a facial image for processing on a neural network;

encoding the facial image into two or more orthogonal feature subspaces, wherein the encoding is performed by a single, trained encoder, wherein the encoder is a downsampling encoder, wherein orthogonality of the feature subspaces is established using metrics, and wherein the orthogonality enables separability of the feature subspaces;

generating embeddings for two or more attributes of the facial image, wherein the embeddings are generated using one or more copies of the single, trained encoder; and pairing the one or more copies of the single, trained encoder with one or more copies of a single decoder.

2. The method of claim 1 wherein the embeddings comprise a vector representation of the two or more attributes of the facial image.

3. The method of claim 1 further comprising training a neural network for a multi-task objective, wherein the training is based on the embeddings.

4. The method of claim 3 wherein the embeddings replace training images.

5. The method of claim 3 wherein the embeddings augment training images.

6. The method of claim 3 wherein the multi-task objective provides identification of the two or more attributes of the facial image.

7. The method of claim 3 wherein the encoding enables unlabeled facial image training.

8. The method of claim 3 wherein the encoding enables semi-labeled facial image training.

9. The method of claim 3 wherein the embeddings enable image analysis that is insensitive to facial attributes.

10. The method of claim 1 wherein disentanglement prevents subspace interference.

11. The method of claim 1 wherein disentanglement loss enables self-supervised training.

12. The method of claim 1 wherein the encoder normalizes features using sigmoid activation.

13. The method of claim 1 wherein the feature subspaces include facial attributes.

14. The method of claim 13 wherein the facial attributes include identity, emotion, lighting, pose, or age.

15. The method of claim 13 wherein an emotion feature subspace includes neutrality, anger, distrust, happiness, sadness, and/or surprise.

16. The method of claim 1 wherein the metrics include weak classification and/or silhouette scores.

17. The method of claim 1 wherein the metrics include a loss function.

18. The method of claim 17 wherein the loss function comprises a disentanglement loss.

19. The method of claim 1 wherein the metrics include t-distributed Stochastic Neighbor Encoding (t-SNE).

20. The method of claim 19 further comprising generating a visual summary of encoder performance using the t-SNE.

21. The method of claim 1 wherein the single decoder is an upsampling decoder.

22. The method of claim 1 wherein the single decoder is targeted for multiple attribute subspaces.

23. The method of claim 1 further comprising feeding the embeddings to the one or more copies of the single decoder for input reconstruction into pixel space.

24. The method of claim 1 further comprising creating synthetic images, based on the embeddings, the single decoder, and an unlabeled sample image.

25. A computer program product embodied in a non-transitory computer readable medium for machine learning, the computer program product comprising code which causes one or more processors to perform operations of:

obtaining a facial image for processing on a neural network;

encoding the facial image into two or more orthogonal feature subspaces, wherein the encoding is performed by a single, trained encoder, wherein the encoder is a downsampling encoder, wherein orthogonality of the feature subspaces is established using metrics, and wherein the orthogonality enables separability of the feature subspaces;

generating embeddings for two or more attributes of the facial image, wherein the embeddings are generated using one or more copies of the single, trained encoder; and pairing the one or more copies of the single, trained encoder with one or more copies of a single decoder.

26. A computer system for machine learning comprising:
a memory which stores instructions;
one or more processors coupled to the memory wherein the one or more processors, when executing the instructions which are stored, are configured to:

obtain a facial image for processing on a neural network;

encode the facial image into two or more orthogonal feature subspaces, wherein the encoding is performed by a single, trained encoder, wherein the encoder is a downsampling encoder, wherein orthogonality of the feature subspaces is established using metrics, and wherein the orthogonality enables separability of the feature subspaces;

generate embeddings for two or more attributes of the facial image, wherein the embeddings are generated using one or more copies of the single, trained encoder; and pair the one or more copies of the single, trained encoder with one or more copies of a single decoder.

*     *     *     *     *